(12) United States Patent
Hayashi

(10) Patent No.: US 12,204,084 B2
(45) Date of Patent: Jan. 21, 2025

(54) MICROSCOPE APPARATUS

(71) Applicant: Evident Corporation, Nagano (JP)

(72) Inventor: Shinichi Hayashi, Tokyo (JP)

(73) Assignee: Evident Corporation, Nagano (JP)

( * ) Notice: Subject to any disclaimer, the term of this patent is extended or adjusted under 35 U.S.C. 154(b) by 830 days.

(21) Appl. No.: 17/320,366

(22) Filed: May 14, 2021

(65) Prior Publication Data

US 2021/0311294 A1     Oct. 7, 2021

Related U.S. Application Data

(63) Continuation of application No. PCT/JP2019/044855, filed on Nov. 15, 2019.

(30) Foreign Application Priority Data

Nov. 19, 2018 (JP) .................................. 2018-216359

(51) Int. Cl.
| | | |
|---|---|---|
| G02B 21/36 | (2006.01) | |
| G02B 21/06 | (2006.01) | |
| H04N 9/64 | (2023.01) | |
| H04N 23/80 | (2023.01) | |

(52) U.S. Cl.
CPC .......... *G02B 21/365* (2013.01); *G02B 21/06* (2013.01); *H04N 9/646* (2013.01); *H04N 23/80* (2023.01)

(58) Field of Classification Search
None
See application file for complete search history.

(56) References Cited

U.S. PATENT DOCUMENTS

| | | | |
|---|---|---|---|
| 2,616,334 A | 11/1952 | Frits | |
| 4,062,619 A | 12/1977 | Hoffman | |
| 4,200,354 A | 4/1980 | Hoffman | |
| 2003/0030902 A1* | 2/2003 | Fukushima | G02B 21/14 359/368 |
| 2014/0098416 A1 | 4/2014 | Schmidt | |

(Continued)

FOREIGN PATENT DOCUMENTS

| | | |
|---|---|---|
| FR | 1059123 A | 3/1954 |
| JP | S61177418 A | 8/1986 |

(Continued)

OTHER PUBLICATIONS

International Search Report (ISR) (and English language translation thereof) dated Jan. 7, 2019 issued in International Application No. PCT/JP2019/044855.

(Continued)

*Primary Examiner* — Heather R Jones

(74) *Attorney, Agent, or Firm* — Holtz, Holtz & Volek PC

(57) ABSTRACT

A microscope apparatus includes an illumination optical system that illuminates a sample, an observation optical system that guides light from the sample, and an intensity modulator that is provided in a pupil of the observation optical system or a position optically conjugate with the pupil and reduces light incident on the intensity modulator. The light utilization rate distribution as an intensity transmittance distribution of the intensity modulator in the pupil or in an image of the pupil monotonously increases or monotonously decreases in a first direction. The light utilization rate distribution varies on both sides of a center of an optical axis.

48 Claims, 24 Drawing Sheets

(56) References Cited

U.S. PATENT DOCUMENTS

| | | | |
|---|---|---|---|
| 2018/0073865 A1 | 3/2018 | Suzuki et al. | |
| 2018/0203172 A1 | 7/2018 | Gugel | |
| 2018/0329193 A1 | 11/2018 | Hirata et al. | |
| 2018/0372918 A1* | 12/2018 | Koga | G02B 1/115 |

FOREIGN PATENT DOCUMENTS

| | | |
|---|---|---|
| JP | H09501780 A | 2/1997 |
| JP | 2003121749 A | 4/2003 |
| JP | 2003131139 A | 5/2003 |
| JP | 2004056587 A | 2/2004 |
| JP | 2014515500 A | 6/2014 |
| JP | 2018045249 A | 3/2018 |
| WO | 2016185729 A1 | 11/2016 |
| WO | 2017098657 A1 | 6/2017 |

OTHER PUBLICATIONS

Chinese Office Action (and English language translation thereof) dated Jul. 22, 2022 issued in counterpart Chinese Application No. 201980075087.

Japanese Office Action dated Jul. 19, 2022 (and English translation thereof) issued in counterpart JP Application No. 2018-216359.

\* cited by examiner

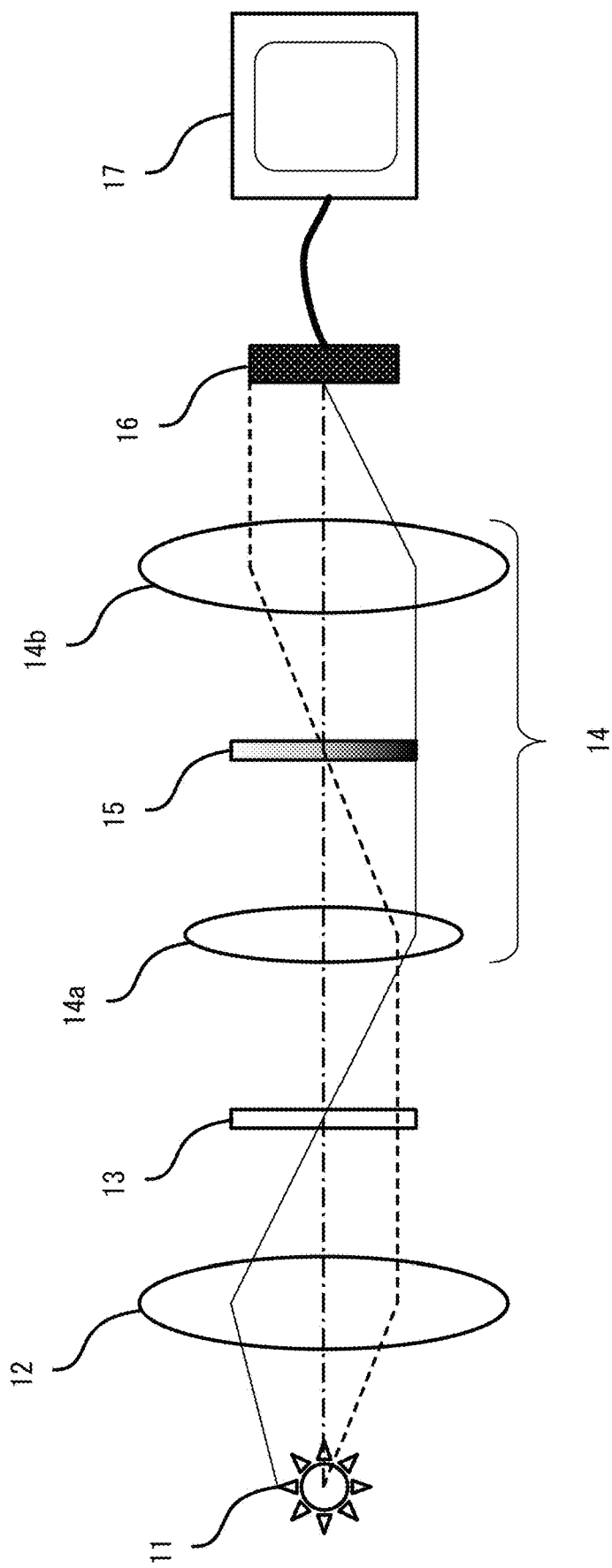
F I G. 1

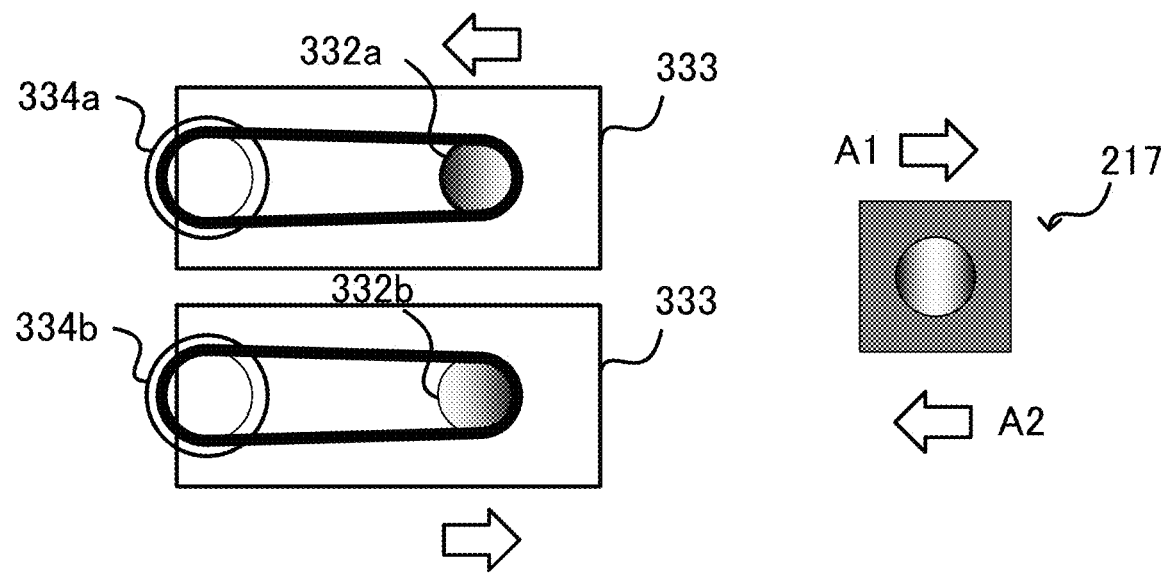
F I G. 1 3

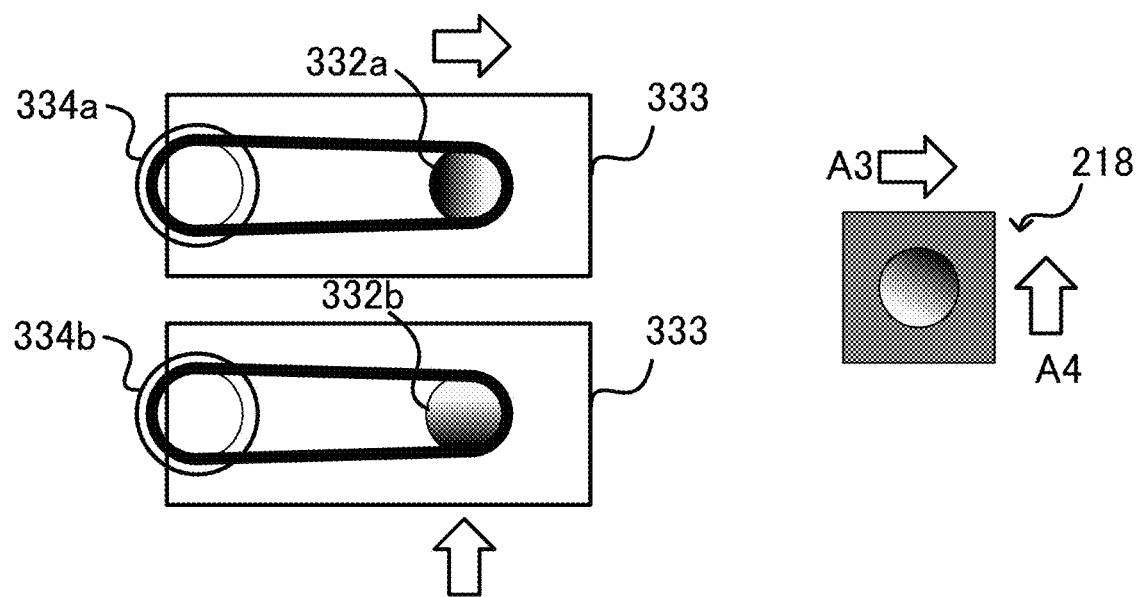
F I G. 1 4

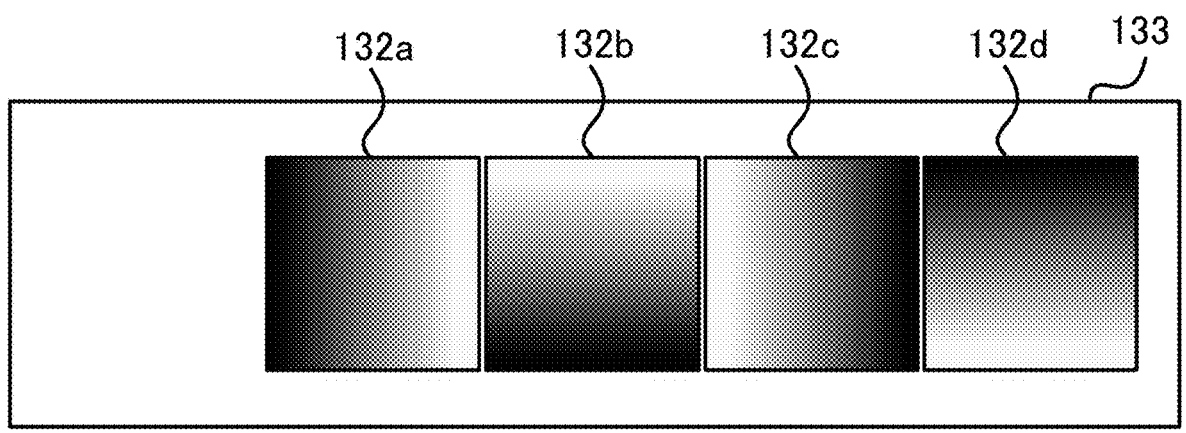
F I G. 1 6

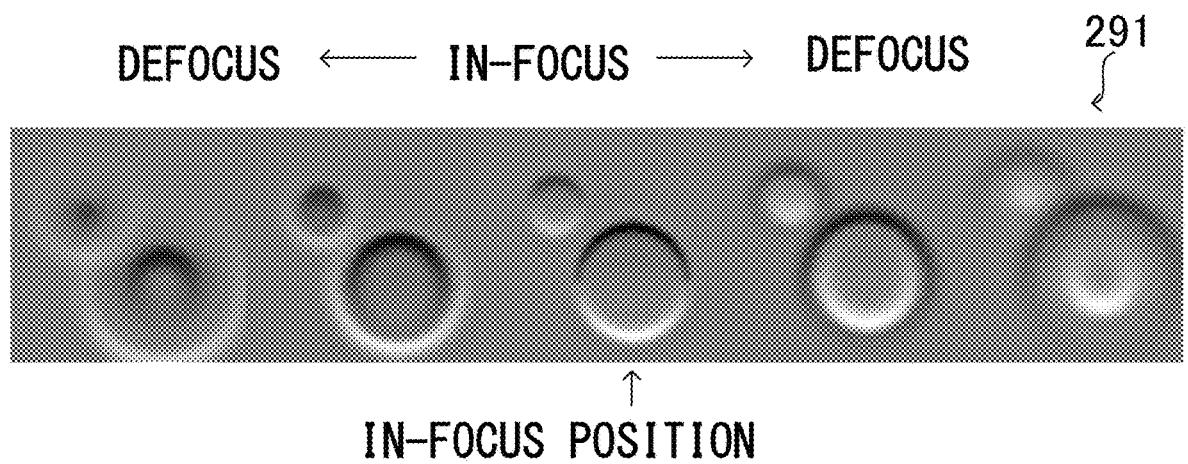
F I G. 2 1 B

MICROSCOPE APPARATUS

CROSS REFERENCE TO RELATED APPLICATIONS

This application is based upon and claims the benefit of priority of the prior Japanese Patent Application No. 2018-216359, filed Nov. 19, 2018, the entire contents of which are incorporated herein by reference.

This is a Continuation Application of PCT Application No. PCT/JP2019/044855, filed Nov. 15, 2019, which was not published under PCT Article 21(2) in English.

BACKGROUND OF THE INVENTION

Field of the Invention

The present invention relates to a microscope apparatus.

Description of the Related Art

As one of methods for observing living cells with the living cells unstained, a differential interference contrast microscopy (hereinafter referred to as DIC) method has been known. The DIC method is an observation method for visualizing a sample in a brightness/darkness contrast occurring due to an interference between polarized light beams, and is described in French Patent No. 1059123, for example. The DIC method is excellent in terms of easily grasping a state of growth of living cells, for example, because image with a stereoscopic effect depending on a brightness corresponding to a phase gradient (hereinafter referred to as a phase gradient image) can be obtained.

SUMMARY OF INVENTION

A microscope apparatus according to an aspect of the present invention includes an illumination optical system that illuminates a sample, an observation optical system that guides light from the sample, and an intensity modulator that is provided in a pupil of the observation optical system or a position optically conjugate with the pupil and reduces light incident on the intensity modulator, in which a light utilization rate distribution as an intensity transmittance distribution of the intensity modulator in the pupil or in an image of the pupil monotonously increases or monotonously decreases in a first direction, and varies on both sides of a center of an optical axis.

A microscope apparatus according to another aspect of the present invention includes an illumination optical system that illuminates a sample, an observation optical system that guides light from the sample, and an intensity modulator that is provided in a pupil of the observation optical system or a position optically conjugate with the pupil and reduces light incident on the intensity modulator, in which a light utilization rate distribution as an intensity reflectance distribution of the intensity modulator in the pupil or in an image of the pupil monotonously increases or monotonously decreases in a first direction, and varies on both sides of a center of an optical axis.

BRIEF DESCRIPTION OF DRAWINGS

The present invention will be more apparent from the following detailed description when the accompanying drawings are referenced.

FIG. 1 is a diagram illustrating a configuration of a microscope apparatus 1.

FIG. 13 is a diagram illustrating an example of a relationship between setting of an intensity modulation section and an image.

FIG. 14 is a diagram illustrating another example of a relationship between setting of the intensity modulation section and an image.

FIG. 16 is a diagram illustrating an example in which a plurality of gradation filters respectively having different azimuths are arranged.

FIG. 21B shows the movement of an image with defocusing.

DESCRIPTION OF EMBODIMENTS

Figure 2:
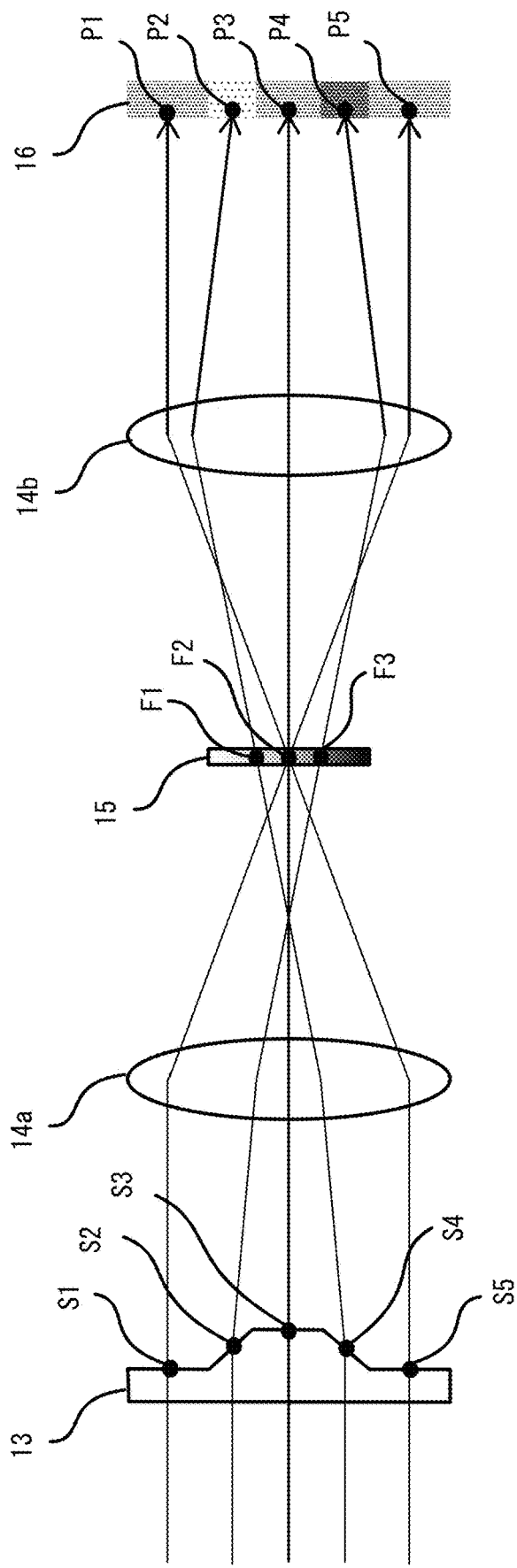
FIG. 2 is a diagram for describing a function of an intensity modulation section 15.

Living cells may be accommodated in a plastic container such as a plastic petri dish. However, plastic disturbs a plane of vibration of incident polarized light. Thus, it is difficult to observe the living cells with the living cells accommodated in the plastic container using a DIC method.

The following is a description of the embodiments of the invention.

FIG. 1 is a diagram illustrating a configuration of a microscope apparatus 1. The microscope apparatus 1 illustrated in FIG. 1 is an apparatus that obtains a phase gradient image similar to an image obtained by a differential interference contrast microscope.

The microscope apparatus 1 includes an illumination optical system 12 that illuminates a sample 13, an observation optical system 14 that guides light from the sample 13 into an image pickup device 16, and an intensity modulation section 15 that reduces incident light. The microscope apparatus 1 may further include a light source 11 that emits illumination light, the image pickup device 16, and a display device 17 that displays an image of the sample 13.

The illumination optical system 12 illuminates the sample 13 with the illumination light emitted from the light source 11. The illumination optical system 12 includes one or more lenses. The sample 13 is a phase object that causes a phase change in the incident light. The sample 13 is an unstained biological sample, for example. The observation optical system 14 guides light transmitted by the sample 13 into the image pickup device 16, to form an optical image of the sample 13 on a light receiving surface of the image pickup device 16. The observation optical system 14 includes a lens 14a and a lens 14b.

The intensity modulation section 15 is provided in a pupil of the observation optical system 14 and reduces incident light to be incident on the intensity modulation section 15. An intensity transmittance distribution of the intensity modulation section 15 in the pupil of the observation optical system 14 monotonously increases or monotonously decreases in a specific direction (hereinafter referred to as a first direction). The monotonous increase or the monotonous decrease is desirably attained within a range of a region through which at least an illumination light flux passes on a pupil plane of the observation optical system 14.

In this specification, a "direction" is defined by a straight line, and an "orientation" is defined by an arrow. That is, although a north-south direction is one direction, for example, a north orientation and a south orientation are respectively different orientations. In this specification, one of two orientations defined by a certain direction is represented as a positive orientation of the certain direction, and the other of the two orientations is represented as a negative orientation of the certain direction. That is, the north orientation is represented as a positive orientation of the south-north direction, and the south orientation is represented as a negative orientation of the south-north direction. Positive or negative itself has no particular meaning. Therefore, the north orientation may be represented as the negative orientation of the south-north direction, and the south orientation may be represented as the positive orientation of the south-north direction.

In this specification, a "monotonous increase" or a "monotonous decrease" includes a case where a monotonous increase or a monotonous decrease gradually occurs in at least three or more steps in addition to a case where an increase or a decrease continuously and monotonously occurs. That is, a monotonous increase in a first direction of an intensity transmittance means that a differential value of an intensity transmittance distribution with respect to a position in the first direction is zero or more regardless of the position in the first direction. A monotonous decrease in a first direction of an intensity transmittance means that a differential value of an intensity transmittance distribution with respect to a position in the first direction is zero or less regardless of the position in the first direction.

The intensity modulation section 15 may include a transmission type light reduction filter having an intensity transmittance distribution, for example. In the case, the intensity transmittance distribution in the pupil monotonously increases or monotonously decreases in the first direction. The light reduction filter is a gradation filter or an ND (neutral density) filter, for example.

The light source 11 emits illumination light for illuminating the sample 13. The light source 11 is a halogen lamp, for example. The image pickup device 16 is an example of an image acquisition section that acquires image data of the sample 13 based on light guided by the observation optical system 14 from the sample 13. The image pickup device 16 is a CCD (charge-coupled device) image sensor or a CMOS (complementary metal-oxide-semiconductor) image sensor, for example. The display device 17 displays a phase gradient image of the sample 13 similar to an image obtained by the differential interference contrast microscope. Examples of the display device 17 include a liquid crystal display, an organic EL (OLED) display, and a CRT (Cathode Ray Tue) display.

FIG. 2 is a diagram for describing a function of the intensity modulation section 15. In the microscope apparatus 1 illustrated in FIG. 1, light transmitted by the sample 13 is reduced by the intensity modulation section 15 at an intensity transmittance corresponding to a phase gradient of the sample 13. This point will be described in detail below with reference to FIG. 2.

In FIG. 2, a light flux emitted from the region on an optical axis among illumination light fluxes emitted from the light source 11 is drawn. The light flux emitted from the region on the optical axis is converted into a parallel light flux parallel to the optical axis by the illumination optical system 12, and is irradiated onto the sample 13, as illustrated in FIG. 1. Accordingly, if the sample 13 has no phase gradient, the parallel light flux parallel to the optical axis is emitted from the sample 13 as it is, and is collected on a pupil position. Therefore, the entire light flux is reduced at the same intensity transmittance in the intensity modulation section 15 regardless of a region through which it has passed in the sample 13. On the other hand, as illustrated in FIG. 2, if the sample 13 has a phase gradient, the light flux incident on the sample 13 is refracted by the phase gradient of the sample 13. Therefore, light beams constituting the light flux respectively pass through different positions of a pupil plane depending on the phase gradient occurring in regions through which they have passed in the sample 13. As a result, the light beams are respectively reduced at different intensity transmittances in the intensity modulation section 15 arranged on the pupil plane.

For example, in an example illustrated in FIG. 2, the sample 13 does not have local phase gradients for the light beams respectively passing through points S1, S3, and S5. Accordingly, the light beams are incident on the observation optical system 14 while remaining parallel to the optical axis without being refracted by the sample 13, and all the light beams pass through a point F2 on the intensity modulation section 15. As a result, all the light beams passing through the points S1, S3, and S5 are respectively reduced at moderate intensity transmittances in the intensity modulation section 15, and are respectively incident on points P5, P3, and P1 on the image pickup device 16. Light and shade of the intensity modulation section 15 illustrated in FIG. 2 represent an intensity transmittance, and light and shade of the image pickup device 16 illustrated in FIG. 2 represent a light intensity on the light receiving surface of the image pickup device 16.

The sample 13 has a local phase gradient for the light beam passing through a point S2. Accordingly, the light beam passing through the point S2 is incident on the observation optical system 14 as a light beam refracted by the sample 13 and inclined with respect to the optical axis, to pass through a point F3 different from the point F2 on the intensity modulation section 15. As a result, the light beam passing through the point S2 is reduced at a low intensity transmittance in the intensity modulation section 15, and is incident on a point P4 on the image pickup device 16.

Further, the sample 13 has a local phase gradient, which is opposite in sign to the phase gradient for the light beam passing through the point S2, for the light beam passing through a point S4. Accordingly, the light beam passing through the point S4 is refracted in an opposite direction to the light beam passing through the point S2 by the sample 13, and is incident on the observation optical system 14 as a light beam inclined in an opposite direction to the light beam passing through the point S2 with respect to the optical axis. As a result, the light beam passing through the point S4 passes through a point F1 positioned on the opposite side to the point F3 with the point F2 as a reference on the intensity modulation section 15. Accordingly, the light beam passing through the point S4 is reduced at a high intensity transmittance in the intensity modulation section 15, and is incident on a point P2 on the image pickup device 16.

As described above, in the microscope apparatus 1, the light beams passing through the sample 13 respectively pass through different positions on the pupil plane depending on the local phase gradients of the sample 13. Further, in the microscope apparatus 1, the intensity transmittance that monotonously increases or monotonously decreases is assigned to the pupil plane. Thus, the light intensity is modulated at the intensity transmittance corresponding to the local phase gradient on the pupil plane. Therefore, the microscope apparatus 1 enables an optical image having the light intensity corresponding to the phase gradient to be formed on the image pickup device 16. Therefore, the phase gradient image similar to the image obtained by the differential interference contrast microscope can be obtained.

In the microscope apparatus 1, the phase gradient image can be obtained by only providing the intensity modulation section 15 on the pupil plane. Accordingly, a high-cost Nomarski prism required in the differential interference contrast microscope need not be used. A dedicated objective lens and a dedicated condenser lens need not be used, unlike in the differential interference contrast microscope. Therefore, the microscope apparatus 1 can be easily implemented from the existing microscope, and can be configured at lower cost than the differential interference contrast microscope.

Further, in the microscope apparatus 1, a contrast is added to an image using refraction of light caused by a phase gradient without using an optical polarization characteristic. Accordingly, even if plastic that disturbs a plane of vibration of polarized light is placed on an optical path, observation is not affected. Therefore, the microscope apparatus 1 enables a plastic container to be used, unlike the differential interference contrast microscope. Therefore, a phase gradient image of the sample 13 can be obtained even with the sample 13 accommodated in the plastic container.

Although an example in which the intensity modulation section 15 is arranged on the pupil of the observation optical system 14 is illustrated in FIG. 1 and FIG. 2, a place where the intensity modulation section 15 is arranged is not limited to the pupil of the observation optical system 14. The intensity modulation section 15 may be arranged on a pupil of the illumination optical system 12, like in a microscope apparatus 2 illustrated in FIG. 3. A lens 12a and a lens 12b are respectively lenses constituting an illumination optical system 12. In this case, a pupil of an observation optical system 14 and a pupil of the illumination optical system 12 are also optically conjugate with each other, whereby a similar effect can be obtained.

That is, an intensity modulation section 15 may be provided at a position optically conjugate with the pupil of the observation optical system 14 or the pupil of the observation optical system 14. If the intensity modulation section 15 is provided at the position optically conjugate with the pupil of the observation optical system 14, an intensity transmittance distribution of the intensity modulation section 15 in an image of the pupil of the observation optical system 14 to be projected onto the position optically conjugate with the pupil may monotonously increase or monotonously decrease in the first direction.

Figure 4:
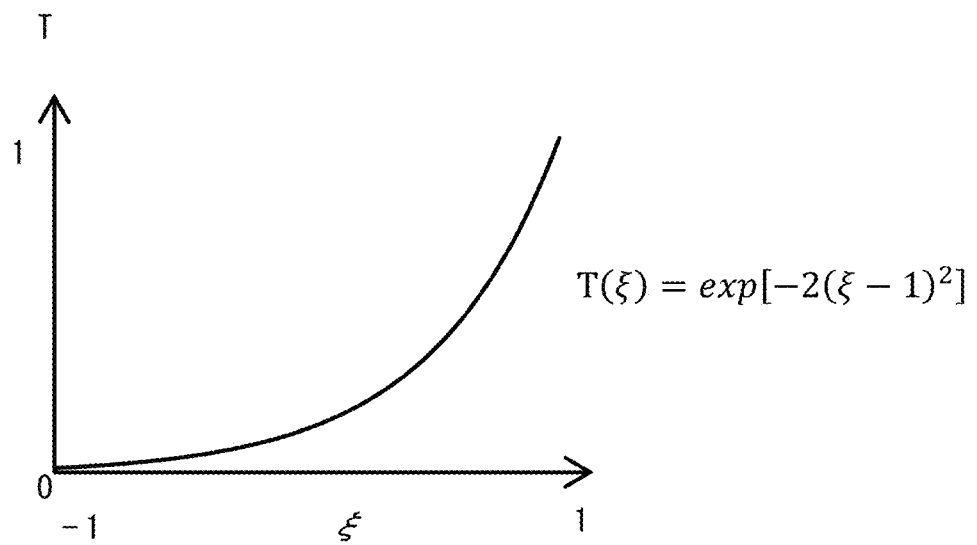
FIG. 4 is a diagram illustrating an intensity transmittance distribution of an intensity modulation section 15.

FIG. 4 is a diagram illustrating an intensity transmittance distribution of the intensity modulation section 15. The intensity modulation section 15 has an intensity transmittance distribution expressed by the following equation (1), for example, as illustrated in FIG. 4, where T represents an intensity transmittance distribution, and ξ represents a position in the first direction in a pupil plane. The position ξ=0 represents a central position of the pupil plane, and positions ξ=−1 and 1 respectively represent end positions of the pupil on the pupil plane.

$$T(\xi)=\exp[-2(\xi-1)^2] \tag{1}$$

A second-order differential value of the intensity transmittance distribution with respect to a position in the first direction expressed by the equation (1) is positive. If the second-order differential value of the intensity transmittance distribution in the pupil with respect to the position in the first direction is positive, a contrast of a phase gradient image can be more improved than when the intensity transmittance linearly changes with respect to the position. Therefore, the second-order differential value of the intensity transmittance distribution in the pupil with respect to the position in the first direction is desirably positive.

The intensity transmittance distribution expressed by the equation (1) is an exponential function of the position in the first direction. If the intensity transmittance distribution in the pupil is the exponential function of the position in the first direction, a ratio of an intensity transmittance acting on a light beam passing through a flat portion of the sample 13 and an intensity transmittance acting on a light beam passing through an inclined portion of the sample 13 is constant regardless of an angle of a light flux to be incident on the sample 13.

Although an illumination light flux emitted from the region on the optical axis in the light source 11 and incident parallel to the optical axis on the sample 13 is illustrated in FIG. 2, for example, an illumination light flux emitted from outside the optical axis in the light source 11 is obliquely incident on the sample 13. As a result, the illumination light flux obliquely incident passes through a position that has moved in parallel by a predetermined distance with respect to the illumination light flux incident in parallel in the intensity modulation section 15. If the intensity transmittance distribution is an exponential function, a ratio of two intensity transmittances, respectively, at positions spaced a predetermined distance apart from each other on a pupil plane is maintained at a predetermined value regardless of the positions. Accordingly, the illumination light flux incident in parallel and the illumination light flux obliquely incident respectively form optical images at the same contrast ratio.

Light to be incident on the image pickup device 16 is a set of illumination light fluxes from respective points on the light source 11. Accordingly, when the illumination light fluxes implement the same contrast ratio, a high contrast can be implemented without respective contrasts being canceled out. Therefore, the intensity transmittance distribution in the pupil is desirably an exponential function of the position in the first direction.

Figure 3:
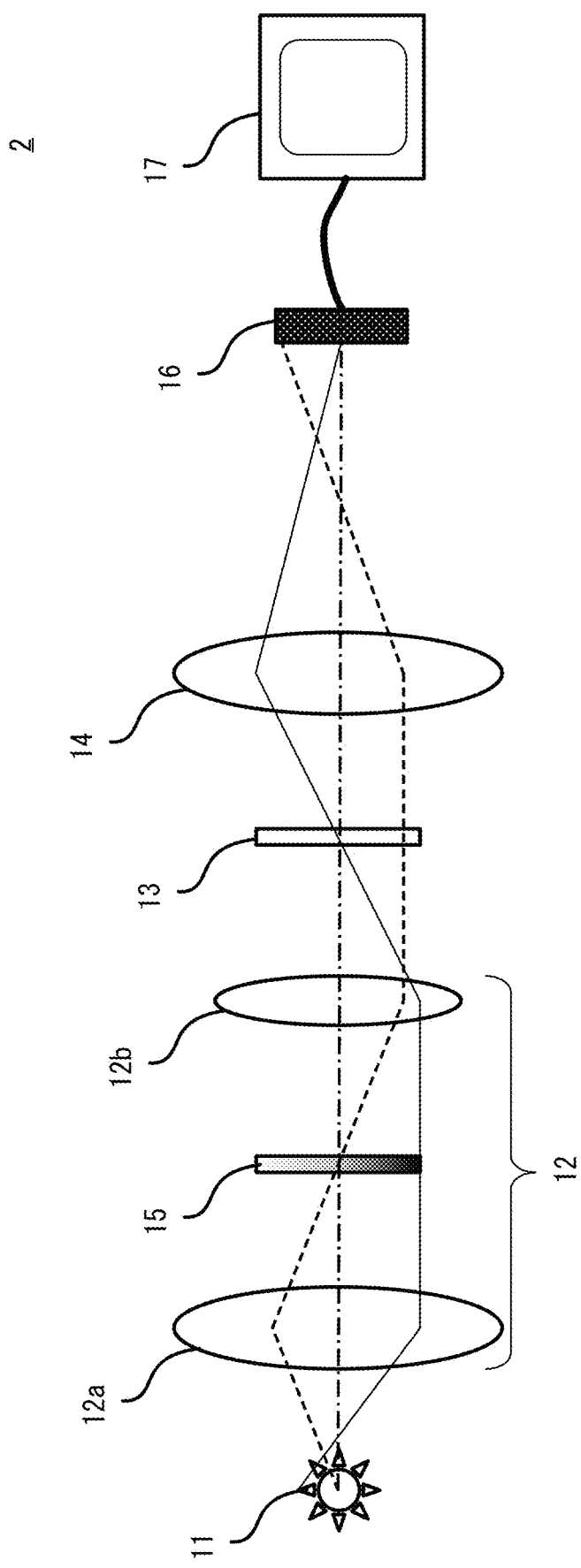
FIG. 3 is a diagram illustrating a configuration of a microscope apparatus 2.
Figure 5:
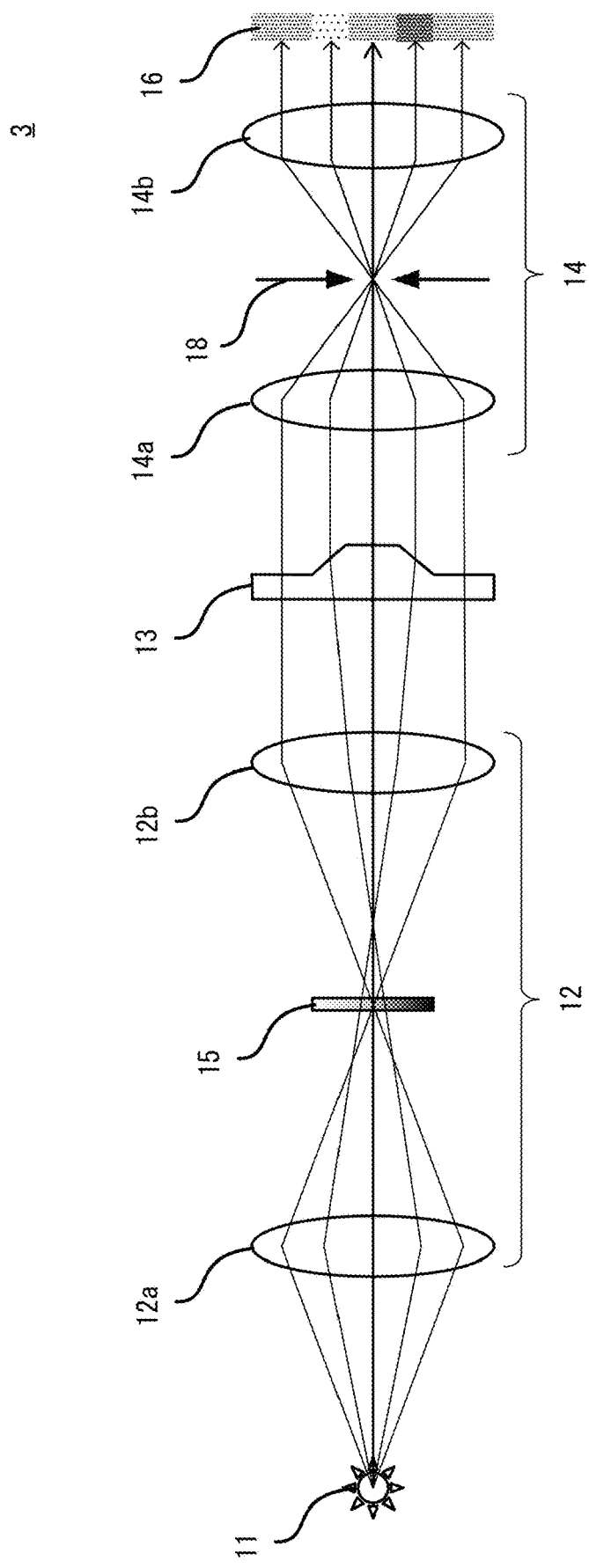
FIG. 5 is a diagram illustrating a configuration of a microscope apparatus 3.

Although the microscope apparatus 1 and the microscope apparatus 2 each having no aperture stop are illustrated in FIG. 1 to FIG. 3, a microscope apparatus 3 illustrated in FIG. 5 includes an aperture stop 18 arranged at a position optically conjugate with an intensity modulation section 15. When an opening diameter of the aperture stop 18 is adjusted, an observation optical system 14 can form an optical image of a sample 13 by a light flux to be emitted from the observation optical system 14 and corresponding to a smaller aperture than an aperture of the intensity modulation section 15. As a result, an optical image having a higher contrast can be obtained than when an optical image is formed by a light flux passing through the entire aperture of the intensity modulation section 15. When the opening diameter of the aperture stop 18 is adjusted, the contrast can also be adjusted.

Although an example in which the intensity modulation section 15 is provided on an illumination optical path from a light source 11 to the sample 13 and the aperture stop 18 is provided on a detection optical path from the sample 13 to an image pickup device 16 is illustrated in FIG. 5, the intensity modulation section 15 and the aperture stop 18 may be respectively arranged on the detection optical path and the illumination optical path because the aperture stop 18 can narrow down a light flux to be incident on the image pickup device 16 so that a similar effect can be obtained even when arranged on the illumination optical path or when arranged on the detection optical path.

In this specification, a numerical aperture of an optical system merely means a numerical aperture determined by an optical design of the optical system and a maximum numerical aperture that can be implemented by the optical system.

When the intensity modulation section 15 is arranged on the detection optical path, a numerical aperture of an illumination optical system 12 is desirably smaller than a numerical aperture on the object side of the observation optical system 14. In this case, if the microscope apparatus 3 does not have the aperture stop 18, an optical image can be formed by a light flux corresponding to a smaller numerical aperture than a numerical aperture on the image side of the observation optical system 14. Therefore, an optical image having a high contrast can be obtained, like when an opening diameter of the numerical aperture stop 18 is adjusted. More specifically, the numerical aperture of the illumination optical system 12 is desirably 90% or less of the numerical aperture on the object side of the observation optical system 14.

Embodiments of the present invention will be specifically described below.

First Embodiment

Figure 6:
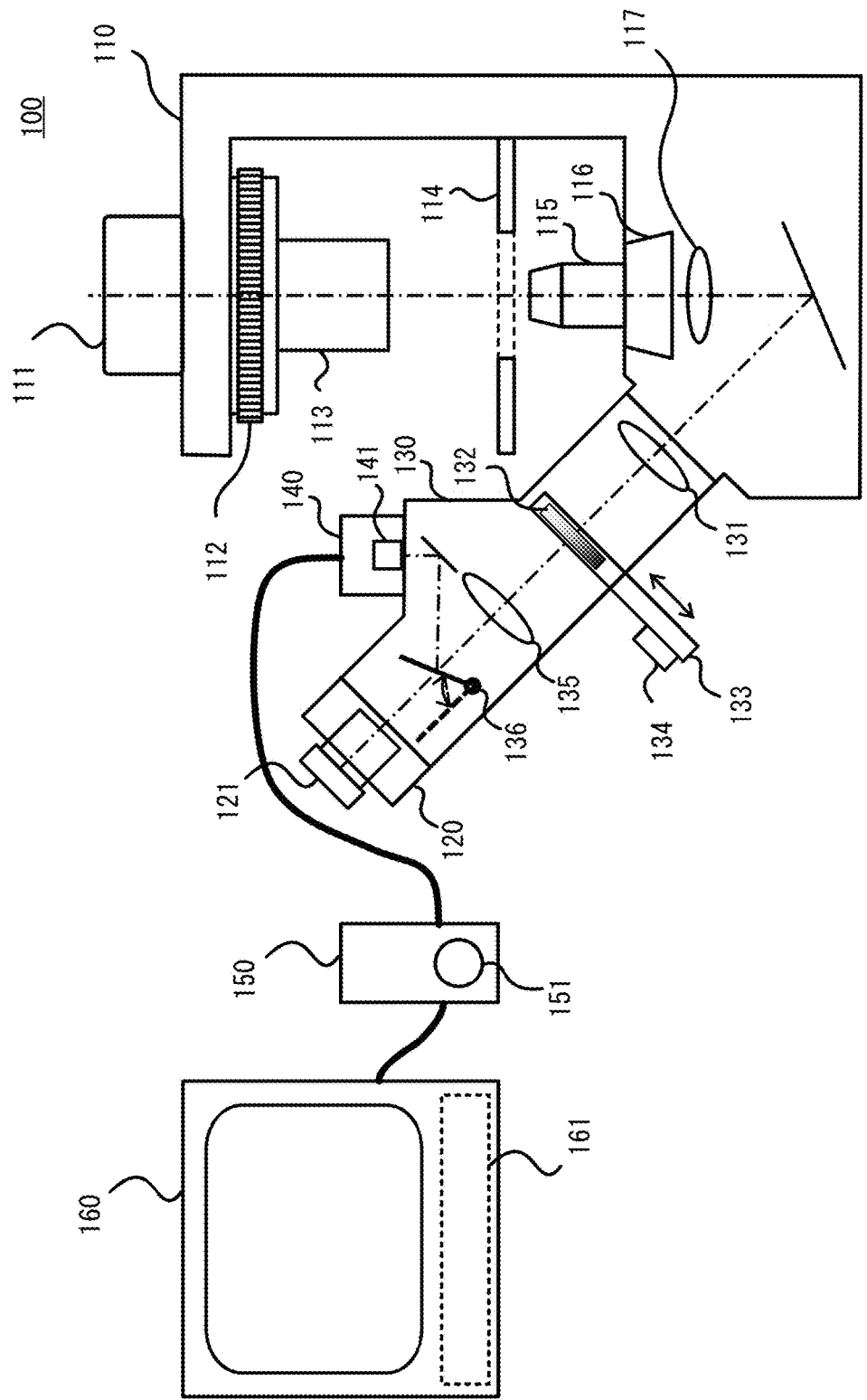
FIG. 6 is a diagram illustrating a configuration of a microscope apparatus 100 according to a first embodiment.
Figure 7:
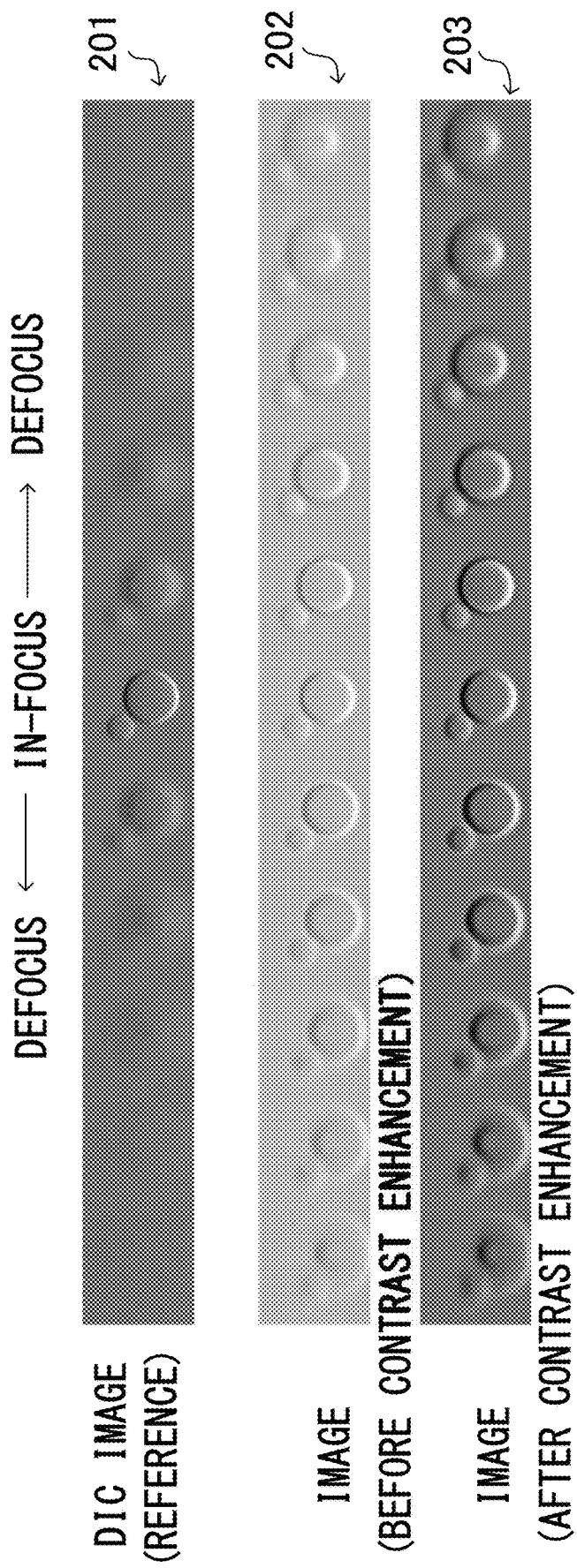
FIG. 7 is a diagram illustrating an effect of contrast enhancement processing.
Figure 8:
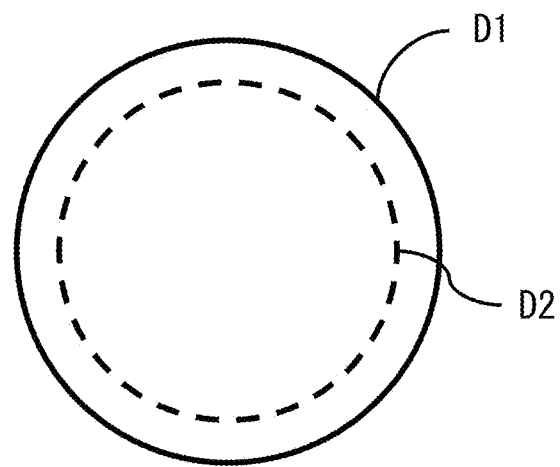
FIG. 8 is a diagram illustrating a range of an illumination light flux on a pupil plane.
Figure 9:
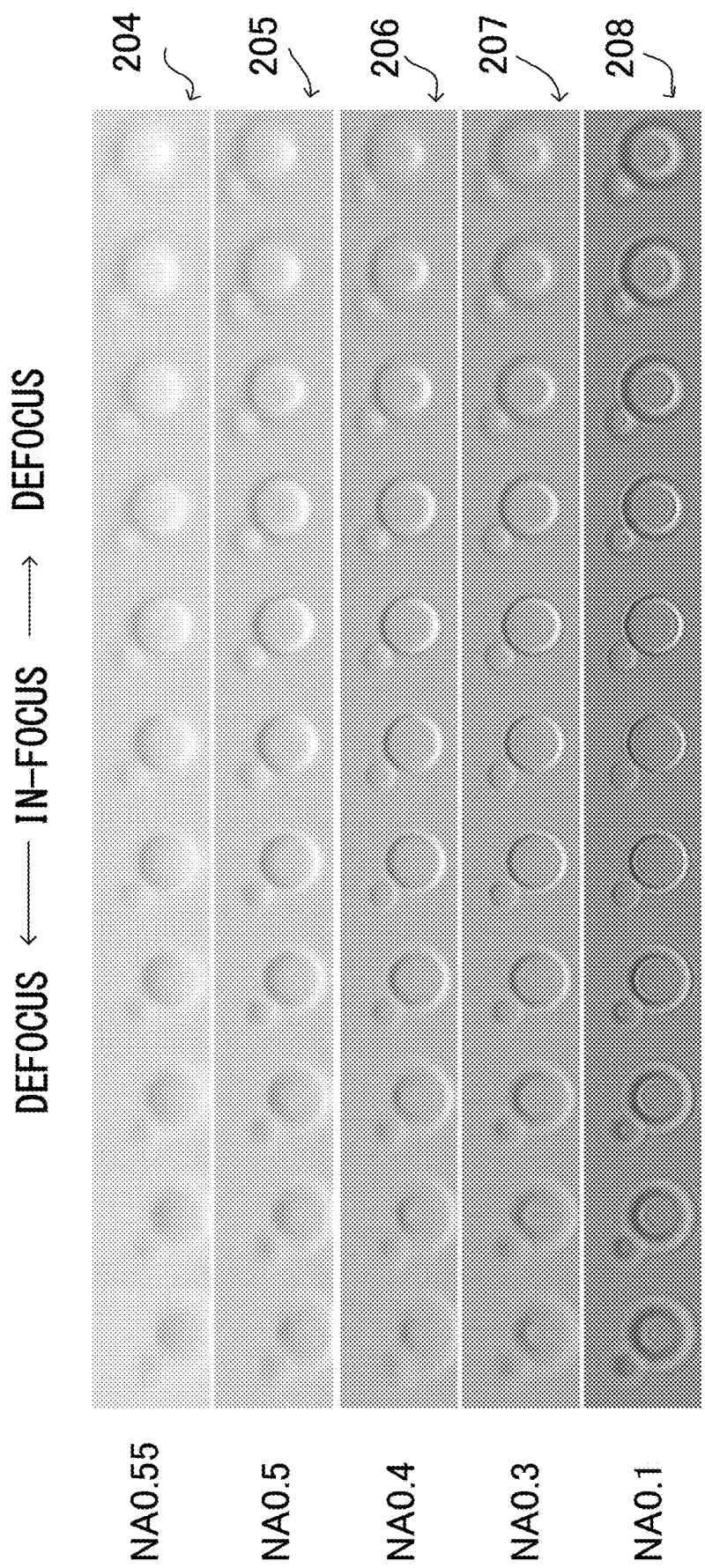
FIG. 9 is a diagram illustrating an example of a relationship between a numerical aperture of an illumination optical system restricted by an aperture stop and a contrast of an image.
Figure 10:
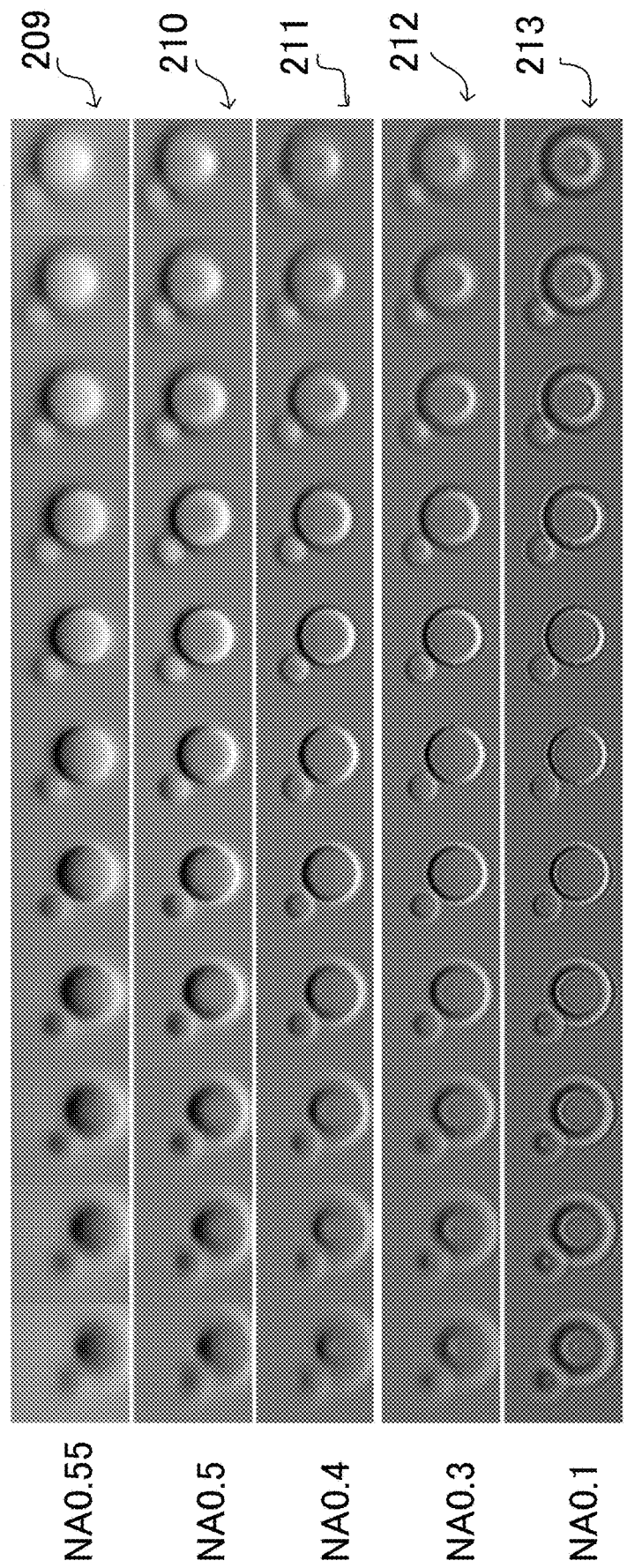
FIG. 10 is a diagram illustrating another example of a relationship between a numerical aperture of an illumination optical system restricted by an aperture stop and a contrast of an image.
Figure 11:
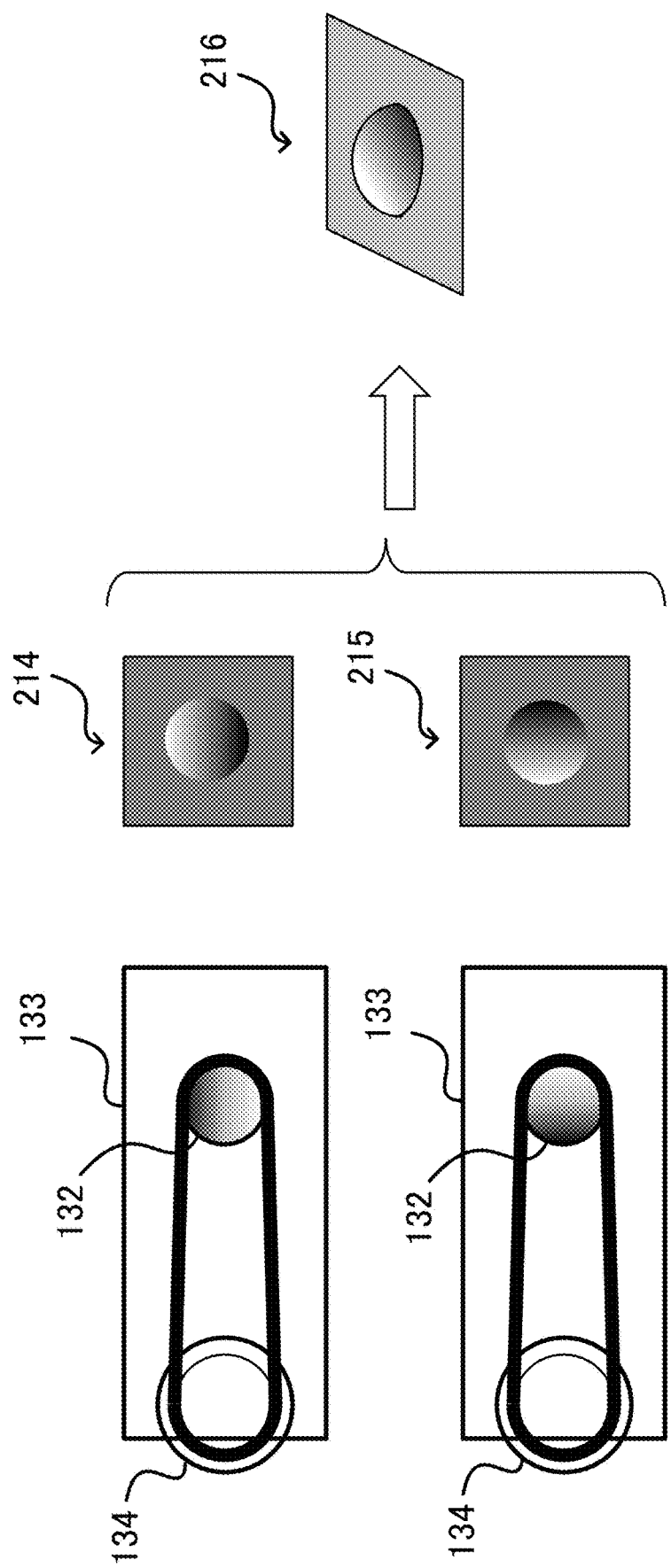
FIG. 11 is a diagram for describing a three-dimensional shape display method.

FIG. 6 is a diagram illustrating a configuration of a microscope apparatus 100 according to the present embodiment. FIG. 7 is a diagram illustrating an effect of contrast enhancement processing. FIG. 8 is a diagram illustrating a range of an illumination light flux on a pupil plane. FIG. 9 and FIG. 10 are diagrams each illustrating a relationship between a numerical aperture of an illumination optical system restricted by an aperture stop and a contrast of an image. FIG. 11 is a diagram for describing a three-dimensional shape display method.

The microscope apparatus 100 includes an inverted microscope including an adapter 130 between a microscope body 110 and a microscope tube 120, a camera 140, a control device 150, and a display device 160, as illustrated in FIG. 6.

The microscope body 110 includes a light source 111, a condenser 113 having an aperture stop 112, a stage 114, an objective lens 115, and a nosepiece 116, and an imaging lens 117. The microscope tube 120 is a monocular or binocular tube, and includes an eyepiece lens 121. The aperture stop 112 is composed of a blade diaphragm or the like, and can adjust its opening diameter.

The adapter 130 includes an optical path switching mirror 136. When a position of the optical path switching mirror 136 is changed, a visual observation state where an optical image formed by the imaging lens 117 is projected onto a front-side focal position of the eyepiece lens 121 and a shooting state where an optical image formed by the imaging lens 117 is projected onto the camera 140 can be switched.

The adapter 130 further includes a relay lens 131, a gradation filter 132, a slider 133, a dial 134, and a relay lens 135. The slider 133 in which the gradation filter 132 is installed is provided between the relay lens 131 and the relay lens 135. When the slider 133 is inserted into a predetermined position, an image of the aperture stop 112 is projected onto the gradation filter 132.

The gradation filter 132 is an example of the above-described intensity modulation section, and has an intensity transmittance that monotonously increases or monotonously decreases in a specific direction. An azimuth of the gradation filter 132 changes in synchronization with rotation of the dial 134 provided in the slider 133. Therefore, a user can adjust a direction in which the intensity transmittance monotonously increases or monotonously decreases by operating the dial 134.

The camera 140 is an image acquisition section that acquires image data of a sample based on light guided by an observation optical system from the sample. The camera 140 may perform enhancement processing for enhancing a contrast of an image of the sample to be displayed on the display device 160 based on the image data. That is, the camera 140 is an image acquisition section, and may be a contrast enhancement section.

The control device 150 is a control device that controls the camera 140, and includes a dial 151. When the user rotates the dial 151, the microscope apparatus 100 can adjust an enhancement amount of the contrast in the enhancement processing. The control device 150 may be a control device that controls the display device 160. In this case, when the user rotates the dial 151, the display device 160 may perform the enhancement processing for enhancing the contrast of the image of the sample to be displayed on the display device 160 based on the image data.

The display device 160 includes a contrast enhancement section 161 that enhances the contrast of the image of the sample based on the image data.

According to the microscope apparatus 100 configured as described above, an optical image having a light intensity corresponding to a phase gradient of a sample can be formed on the camera 140 by an intensity transmittance distribution of the gradation filter 132. Accordingly, an image 202 and an image 203 as a phase gradient image similar to an image 201 obtained by a differential interference contrast microscope can be obtained, as illustrated in FIG. 7. The image 201, the image 202, and the image 203 are images each obtained by shooting two large and small hemispherical samples. The image 202 is an image the contrast of which has not been enhanced by the camera 140, and the image 203 is an image the contrast of which has been enhanced by the camera 140.

In the microscope apparatus 100, the gradation filter 132 converts a phase gradient into a contrast, and further enhances the contrast by image processing. As a result, an image the phase gradient of which is sufficiently visually recognized as a contrast can be obtained, as indicated by the image illustrated in FIG. 7.

In the microscope apparatus 100, a phase gradient image can be obtained by only adding the adapter 130 to the existing microscope. A phase gradient image can be obtained without using an optical polarization characteristic. Therefore, the microscope apparatus 100 enables a phase gradient image of a sample to be obtained with the sample accommodated in a plastic container with a low-cost configuration.

Further, in the microscope apparatus 100, when the opening diameter of the aperture stop 112 is adjusted, a region D2 through which an illumination light flux passes can be made to fall within a pupil D1 of the objective lens 115 on a pupil plane of the objective lens 115, as illustrated in FIG. 8. Accordingly, a variation in contrast depending on an angle of incident light can be suppressed, whereby a high contrast can be obtained. The contrast can also be adjusted.

Each of an image 204 to an image 208 illustrated in FIG. 9 is an image the contrast of which has not been enhanced by image processing and is an image obtained when a numerical aperture (NA) of the illumination optical system restricted by the aperture stop 112 is gradually decreased from 0.55 to 0.1. Each of an image 209 to an image 213 illustrated in FIG. 10 is an image the contrast of which has been enhanced by image processing and is an image obtained when the numerical aperture (NA) of the illumination optical system restricted by the aperture stop 112 is gradually decreased from 0.55 to 0.1. As illustrated in FIG. 9 and FIG. 10, the smaller the numerical aperture of the illumination optical system restricted by the aperture stop 112 is, the more the contrast is enhanced. On the other hand, when the constant is too enhanced, a stereoscopic effect is lost. Thus, the aperture stop 112 is desirably adjusted by viewing a balance between the contrast and the stereoscopic effect.

A defocus characteristic changes depending on the contrast. When the contrast is too high, an image is blurred as well as a ringing becomes pronounced as a defocus amount increases. Accordingly, the aperture stop 112 is desirably adjusted in view of the defocus characteristic in addition to the contrast and the stereoscopic effect.

When the contrast is too enhanced by the image processing, a noise strongly overlaps an image. Accordingly, the contrast of the image before the image processing is desirably high to some extent. Specifically, the numerical aperture of the illumination optical system restricted by the aperture stop 112 is desirably 90% or less of a numerical aperture on the object side of the objective lens 115.

Further, in the microscope apparatus 100, when the dial 134 is rotated, the azimuth of the gradation filter 132 can be changed. As a result, a direction in which a contrast is added to a phase gradient image, i.e., a direction in which a phase gradient is detected can be adjusted. As illustrated in FIG. 11, when the dial 134 is rotated, two phase gradient images (an image 214 and an image 215) may be respectively acquired in orientations that differ by 90 degrees in the azimuth of the gradation filter 132. When the two phase gradient images that differ by 90 degrees in the azimuth are subjected to operation processing, missing of information caused by a detection direction of the phase gradient can be compensated for. Thus, a three-dimensional shape of the sample can be more accurately displayed, as indicated by an image 216.

Second Embodiment

Figure 12:
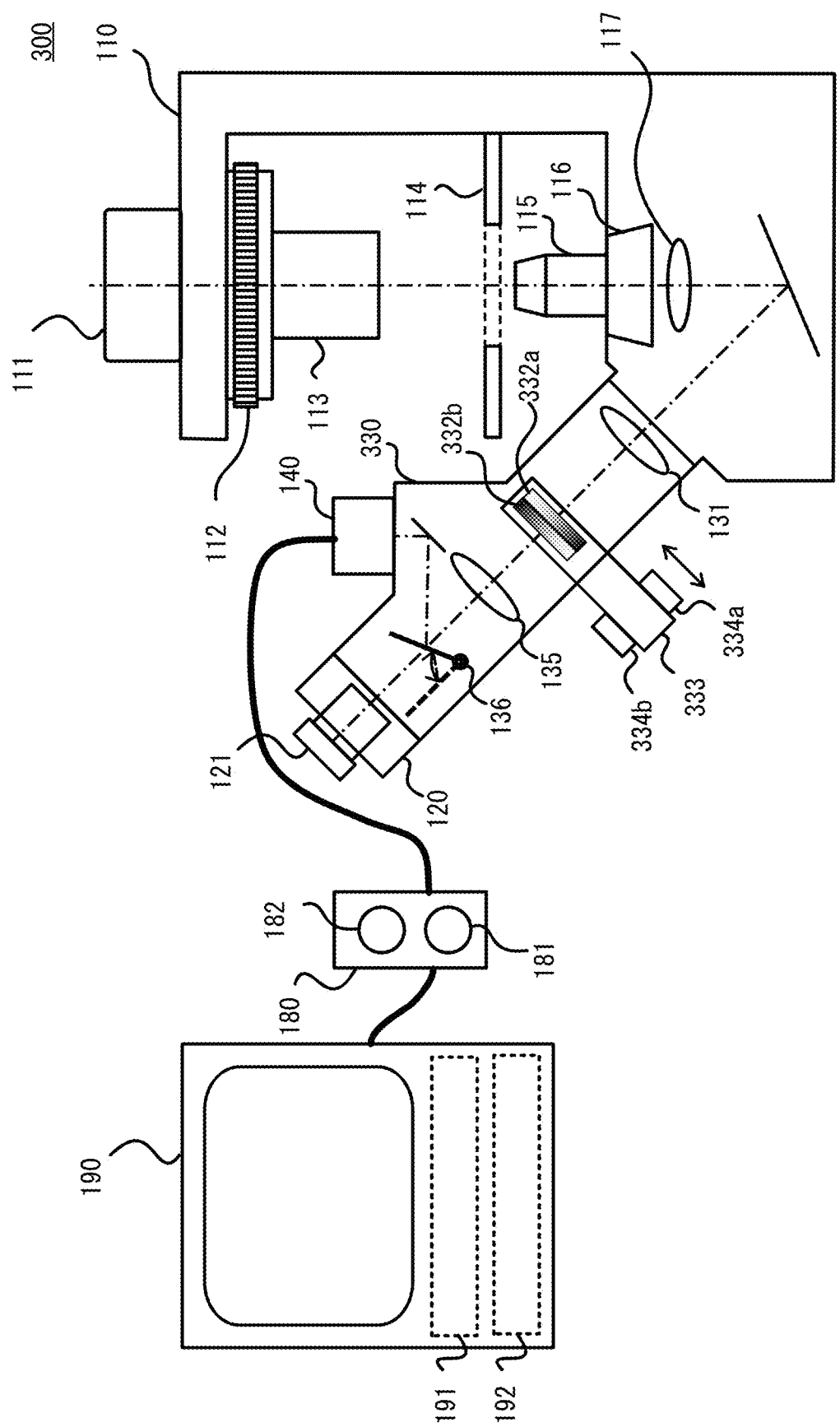
FIG. 12 is a diagram illustrating a configuration of a microscope apparatus 300 according to a second embodiment.
Figure 15:
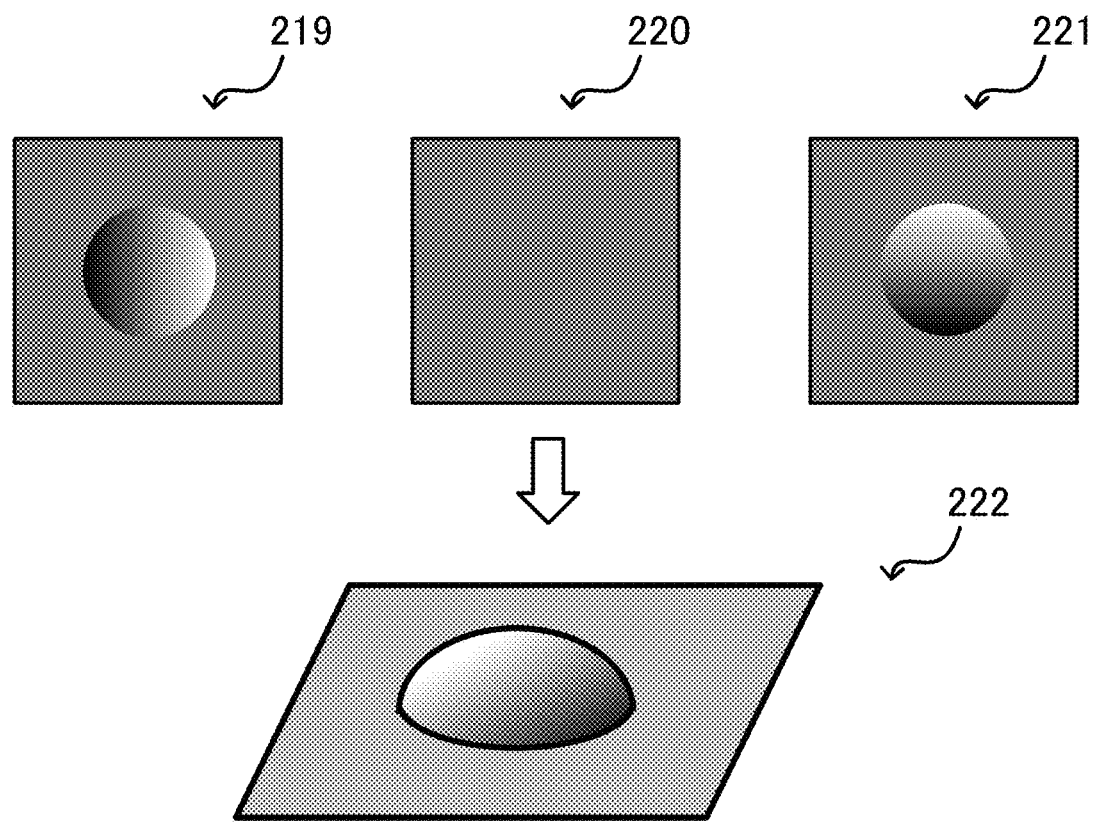
FIG. 15 is a diagram for describing a three-dimensional shape display method.
Figure 17:
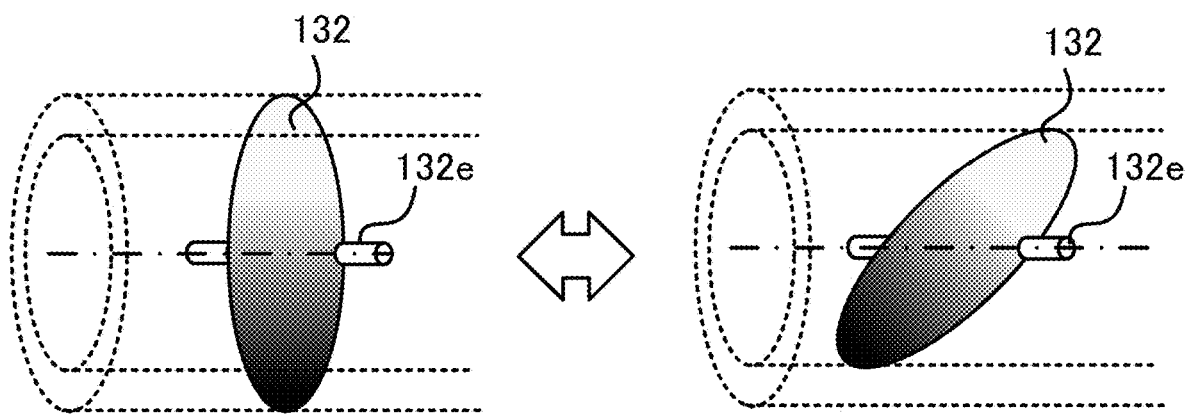
FIG. 17 is a diagram illustrating an example in which an angle of a gradation filter is changed.

FIG. 12 is a diagram illustrating a configuration of a microscope apparatus 300 according to the present embodiment. FIG. 13 and FIG. 14 are diagrams each illustrating a relationship between setting of an intensity modulation section and an image. FIG. 15 is a diagram for describing a three-dimensional shape display method.

The microscope apparatus 300 are similar to the microscope apparatus 100 except that it includes an adapter 330 instead of the adapter 130, except that it includes a control device 180 instead of the control device 150, and except that it includes a display device 190 instead of the display device 160.

The control device 180 includes a dial 182 that adjusts chroma enhancement processing to be performed by a camera 140 or a display device 190 in addition to a dial 181 that adjusts contrast enhancement processing to be performed by the camera 140 or the display device 190.

The display device 190 includes a chroma enhancement section 192 that performs chroma enhancement processing in addition to a contrast enhancement section 191 that performs contrast enhancement processing. The chroma enhancement section 192 performs processing for enhancing chroma of an image of a sample to be displayed on the display device 190 based on image data.

The adapter 330 differs from the adapter 130 in that it includes a slider 333 instead of the slider 133. The slider 333 is arranged on an optical path between a relay lens 131 and a relay lens 135, and a plurality of gradation color filters (a gradation color filter 332a and a gradation color filter 332b) are installed in the slider 333. When the slider 333 is inserted into a predetermined position, an image of an aperture stop 112 is projected onto an intensity modulation section including the plurality of gradation color filters.

Each of the gradation color filter 332a and the gradation color filter 332b is an example of a plurality of intensity modulation elements that differ in spectral transmittance distribution (spectral intensity transmittance distribution). The gradation color filter 332a has an intensity transmittance that monotonously increases or monotonously decreases in a specific direction for a first wavelength. The gradation filter 332b has an intensity transmittance that monotonously increases or monotonously decreases in a specific direction for a second wavelength different from the first wavelength. The first wavelength is a red wavelength, for example, and the second wavelength is a blue wavelength, for example.

An azimuth of the gradation color filter 332a can be changed by rotating a dial 334a provided in the slider 333. An azimuth of the gradation color filter 332b can be changed by rotating a dial 334b provided in the slider 333.

The microscope apparatus 300 configured as described above also enables light to be reduced depending on a phase gradient in the intensity modulation section including the plurality of gradation color filters, and thus enables a phase gradient image similar to an image obtained by a differential interference contrast microscope to be obtained, like the microscope apparatus 100.

In the microscope apparatus 300, when the dial 334a and the dial 334b are operated to oppositely orient the two gradation color filters, a first intensity transmittance distribution for a first wavelength of an intensity modulation section in a pupil monotonously increases in a positive orientation of a first direction, and a second intensity transmittance distribution for a second wavelength of the intensity modulation section in the pupil monotonously increases in a negative orientation of the first direction. As a result, phase gradient images respectively having different colors can be obtained depending on a sign of a phase gradient in the first direction, as indicated by an image 217. Specifically, an image in which red is darkened in an orientation indicated by an arrow A1 and blue is darkened in an orientation indicated by an arrow A2 can be obtained, for example. Therefore, a shape, particularly unevenness of a sample can be recognized depending on a difference in color in addition to light and shade, and positive and negative phase gradients can also be recognized depending on the difference in color. Accordingly, the microscope apparatus 300 can correctly recognize the shape of the sample more easily than the microscope apparatus 100.

In the microscope apparatus 300, when the dial 334a and the dial 334b are operated to make respective azimuths of the two gradation color filters deviate by 90 degrees, for example, a first intensity transmittance distribution for a first wavelength of an intensity modulation section in a pupil monotonously increases or monotonously decreases in a first direction, and a second intensity transmittance distribution for a second wavelength of the intensity modulation section in the pupil monotonously increases or monotonously decreases in a direction different from the first direction, as illustrated in FIG. 14. As a result, phase gradient images respectively having different hues (color balances) depending on a direction of a phase gradient can be obtained, as indicated by an image 218. Specifically, an image in which red is darkened in an orientation indicated by an arrow A3 and blue is darkened in an orientation indicated by an arrow A4 can be obtained, for example. Therefore, a shape, particularly a two-dimensional distribution in a thickness direction of a sample can be recognized depending on a difference in color in addition to light and shade, and an orientation of a phase gradient can also be recognized depending on a difference in hue. Accordingly, the microscope apparatus 300 can correctly recognize the shape of the sample more easily than the microscope apparatus 100.

In the microscope apparatus 300, a phase gradient image acquired by the camera 140 may be decomposed into an image 219 of an R component, an image 220 of a G component, and an image 221 of a B component, as illustrated in FIG. 15. When phase gradients in different directions are respectively detected from the images, a three-dimensional shape of a sample can be specified, and the specified three-dimensional shape of the sample can be three-dimensionally displayed, as indicated by an image 222.

Although an example in which the gradation color filter 332a and the gradation color filter 332b differ in direction or orientation in which an intensity transmittance monotonically increases or monotonically decreases has been illustrated above, they may be in the same orientation. In the case, the gradation color filter 332a and the gradation color filter 332b desirably differ in increase rate or decrease rate of the intensity transmittance. That is, an intensity transmittance distribution in a pupil desirably has an increase rate or a decrease rate that differs in a positive orientation of a first direction depending on a wavelength. As a result, a difference occurs in a ratio of the intensity transmittances between the wavelengths in the positive orientation of the first direction. Thus, phase gradient images respectively having different hues depending on the phase gradient can be obtained.

In the microscope apparatus 100 illustrated in FIG. 6 and the microscope apparatus 300 illustrated in FIG. 12, an example in which a dial provided in a slider is rotated to change an azimuth of a gradation filter or a gradation color filter, i.e., a detection direction of a phase gradient has been illustrated, the detection direction of the phase gradient may be changed using another method. For example, in the microscope apparatus 100, the slider 133 may be provided with an intensity modulation section including a plurality of intensity modulation elements, as illustrated in FIG. 16. The plurality of intensity modulation elements are a plurality of gradation filters (a gradation filter 132a, a gradation filter 132b, a gradation filter 132c, and a gradation filter 132d) respectively having intensity transmittance distributions that differ in orientation that monotonously increases or monotonously decreases. The slider 133 is slid in a direction intersecting an optical axis of an observation optical system, to move the plurality of intensity modulation elements, and thus to change the intensity modulation elements placed on an optical path so that the detection direction of the phase gradient may be changed.

Although FIG. 6 illustrates an example in which the dial 134 that rotates the intensity modulation section functions as change means for changing an intensity transmittance distribution of the intensity modulation section in a pupil or in an image of the pupil, and FIG. 16 illustrates an example in which the slider 133 functions as change means, the change means is not limited to these examples. For example, the change means may be a rotation shaft 132e that changes an angle of an intensity modulation section (gradation filter 132) with respect to an optical axis of an observation optical system. When the rotation shaft 132e is rotated to match a pupil diameter of an objective lens, a region where an intensity transmittance of the gradation filter 132 is the highest and a region where the intensity transmittance is the lowest can be made to match an end of the pupil. Accordingly, a high contrast can be obtained effectively utilizing an intensity transmittance distribution of the gradation filter 132.

Third Embodiment

Figure 18:
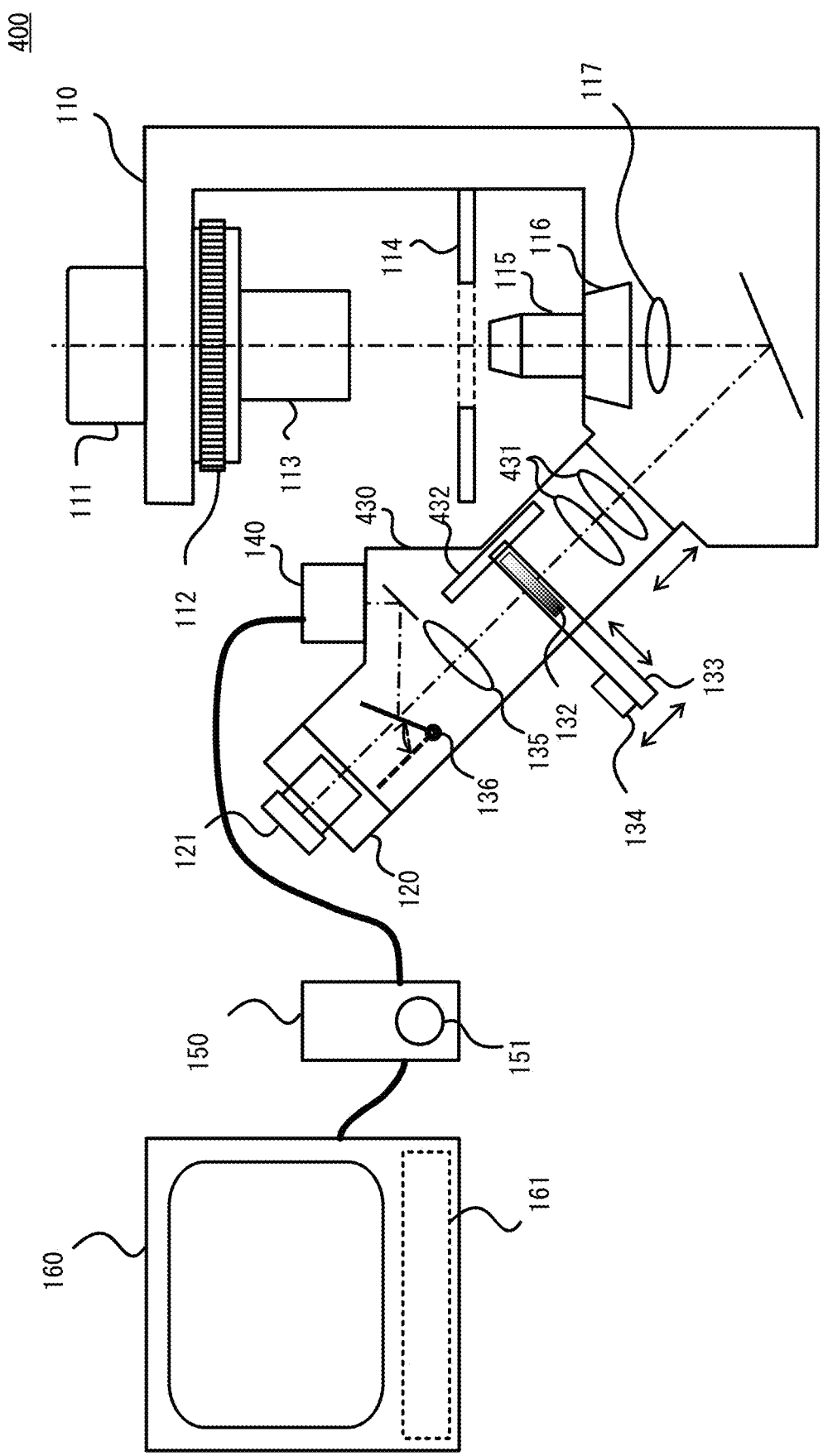
FIG. 18 is a diagram illustrating a configuration of a microscope apparatus 400 according to a third embodiment.

FIG. 18 is a diagram illustrating a configuration of a microscope apparatus 400 according to the present embodiment. The microscope apparatus 400 is similar to the microscope apparatus 100 except that it includes an adapter 430 instead of the adapter 130.

The adapter 430 differs from the adapter 130 in that it includes a variable focus optical system 431 instead of the relay lens 131 and in that it includes a guide 432 that guides a slider 133.

The variable focus optical system 431 is included in an observation optical system, and is arranged on an optical path between a gradation filter 132 and a sample. When a focal length of the variable focus optical system 431 is changed, the size of an image of a pupil of an objective lens 115 to be projected onto a gradation filter 132 changes. Therefore, when the focal length of the variable focus optical system 431 is changed, determination which range of an intensity transmittance distribution of the gradation filter 132 is used can be adjusted. A change in pupil diameter caused by replacement of the objective lens can also be coped with by a change in focal length of the variable focus optical system 431.

The guide 432 is an example of movement means for moving the gradation filter 132 in an optical axis direction by guiding movement of the slider 133 in the optical axis direction. When an intensity modulation section including the gradation filter 132 is moved in the optical axis direction by the movement means, a positional relationship between the intensity modulation section and a pupil plane can be adjusted. This is particularly effective when a position of the pupil plane has changed by replacing the objective lens.

The microscope apparatus 400 configured as described above also enables light to be reduced depending on a phase gradient in the intensity modulation section, and thus enables a phase gradient image similar to an image obtained by a differential interference contrast microscope to be obtained, like the microscope apparatus 100.

Figure 19:
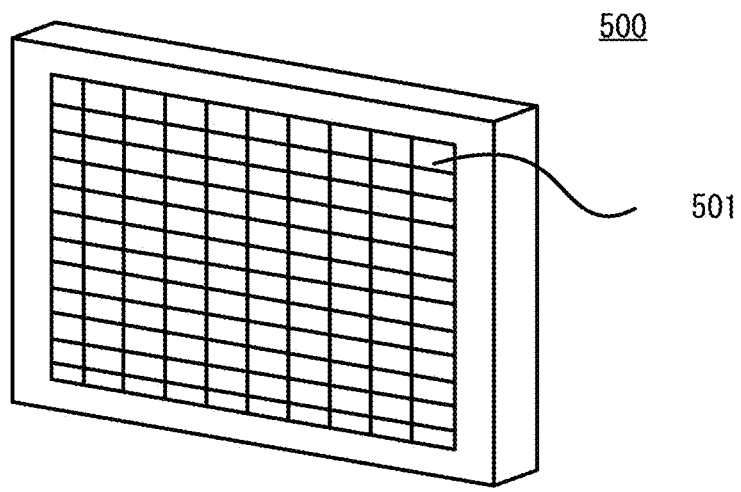
FIG. 19 is a diagram illustrating a spatial light modulator 500.

Although an example in which the intensity modulation section includes the gradation filter has been illustrated in FIG. 6, FIG. 12, and FIG. 18, the intensity modulation section is not limited to the gradation filter. For example, a spatial light modulator 500 in which a plurality of pixels 501 are arranged in a lattice shape, as illustrated in FIG. 19, may be used, and the spatial light modulator 500 may implement an intensity transmittance distribution that monotonously increases or monotonously decreases in a first direction.

Fourth Embodiment

Figure 20:
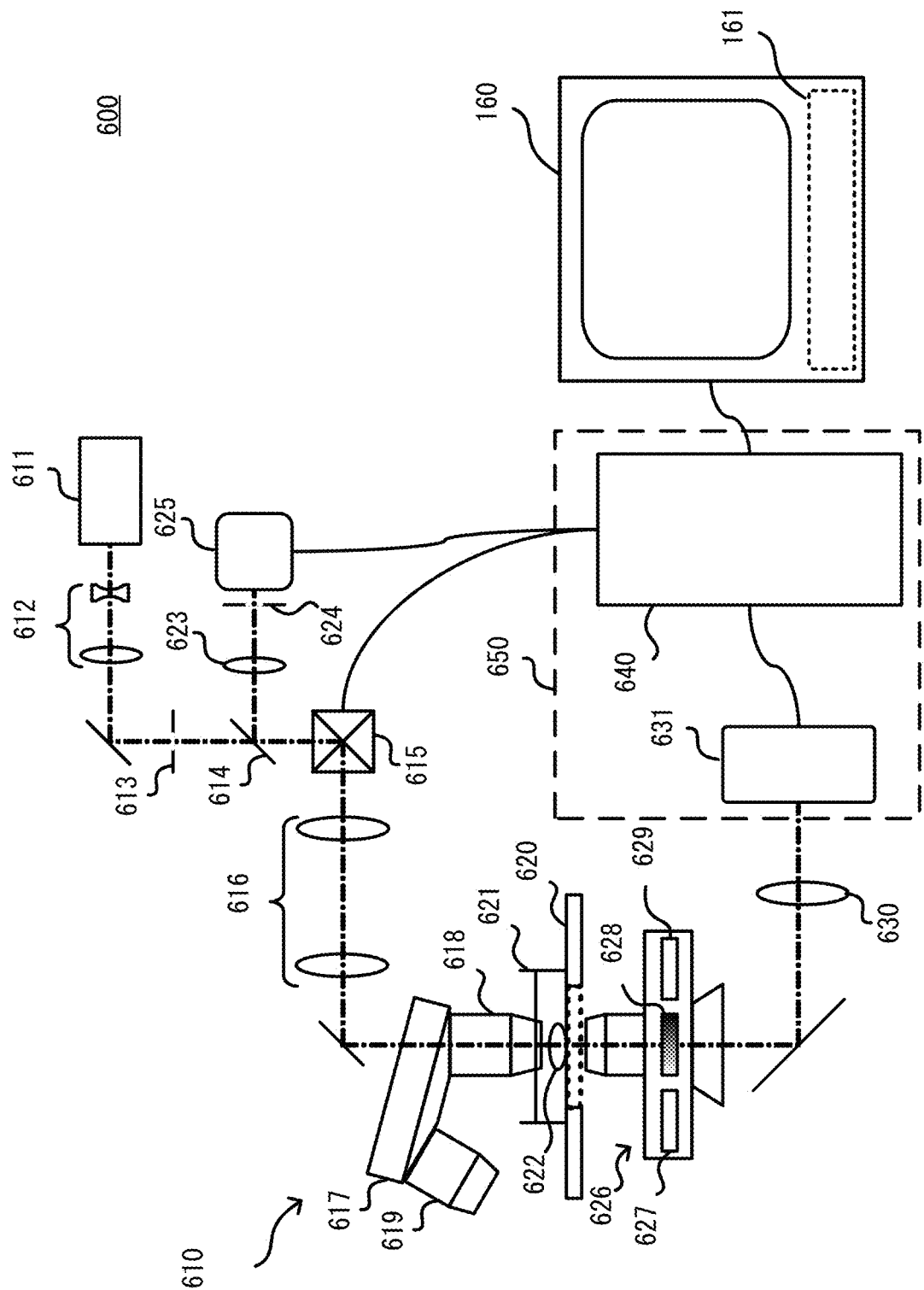
FIG. 20 is a diagram illustrating a configuration of a microscope apparatus 600 according to the fourth embodiment.

FIG. 20 is a diagram illustrating a configuration of a microscope apparatus 600 according to the present embodiment. The microscope apparatus 600 includes a microscope main body 610, a computer 640, and a display device 160. A PMT 631 and the computer 640 constitute an image acquisition section 650.

The microscope main body 610 is an implementation of a laser scanning microscope, and can obtain a confocal image by cooperating with the computer 640. Laser light emitted from a laser light source 611 are incident on an objective lens 618 mounted on a nosepiece 617 via an aperture stop 613, a dichroic mirror 614, a galvano mirror 615, and a relay lens 616 after light flux diameter is enlarged by a beam expander 612. An objective lens 619 having a different magnification from that of the objective lens 618 is mounted on the nosepiece 617 in addition to the objective lens 618. The objective lens 618 collects the laser light, and irradiates the laser light onto one point of a cultured cell 622 in a plastic petri dish 621 placed on a stage 620. A position where the laser light is collected is controllable depending on a deflection direction of the laser light in the galvano mirror 615. Therefore, when the galvano mirror 615 is controlled, the cultured cell 622 can be two-dimensionally scanned.

In the cultured cell 622 irradiated with the laser light, fluorescence is generated, and is incident on the dichroic mirror 614 via the objective lens 618, the relay lens 616, and the galvano mirror 615. Then, the fluorescence reflected by the dichroic mirror 614 is irradiated onto a confocal aperture 624 by a lens 623, and only the fluorescence emitted from a focal position is incident on a photomultiplier (hereinafter referred to as a PMT) 625 after passing through a pinhole provided in the confocal aperture 624.

The computer 640 two-dimensionally maps a signal to be outputted from the PMT 625 during scanning of the cultural cell 622 using respective scanning positions of the laser light, to obtain a confocal image.

The microscope main body 610 further includes a universal condenser 626, a lens 630, and the PMT 631. A plurality of modulation elements (a modulation element 627, a modulation element 628, and a modulation element 629) are accommodated in a turret of the universal condenser 626, and the modulation element selected from among the plurality of modulation elements can be arranged on an optical path.

At least one of the plurality of modulation elements accommodated in the universal condenser 626 is an intensity modulation section. In this example, the modulation element 628 is a gradation filter having an intensity transmittance distribution that monotonously increases or monotonously decreases in a specific direction, for example, and is arranged at a position optically conjugate with a pupil of the objective lens 618.

The laser light irradiated onto the cultural cell 622 are incident on the universal condenser 626 after being transmitted by the plastic petri dish 621. Then, the laser light is reduced at an intensity transmittance corresponding to a phase gradient by the modulation element 628 in the universal condenser 626, and are incident on the PMT 631 via the lens 630.

The computer 640 two-dimensionally maps a signal to be outputted from the PMT 631 during scanning of the cultural cell 622 using respective scanning positions of the laser light, to obtain a phase gradient image. The computer 640 may perform image processing for enhancing a contrast of the phase gradient image, or a contrast enhancement section 161 in the display device 160 may perform image processing for enhancing a contrast instead of the computer 640.

If the phase gradient image is obtained, an opening diameter of the aperture stop 613 is desirably adjusted such that a numerical aperture of a light flux to be emitted from the objective lens 618 is smaller than a numerical aperture of the universal condenser 626. As a result, a phase gradient image having a high contrast can be obtained.

According to the microscope apparatus 600 configured as described above, a phase gradient image similar to an image obtained by a differential interference contrast microscope can be obtained simultaneously with the confocal image. Accordingly, for a living cell that moves, a correlation between a position of a fluorescent pigment and a structure of the cell can be accurately grasped.

The above-described embodiments are specific examples for each making understanding of the invention easy, and the present invention is not limited to the embodiments. Still another embodiment of the present invention may be configured by applying some of the above-described embodiments to the other embodiment. Various modifications and variations of the microscope apparatus can be made without departing from the scope of the claims.

Although an example in which a phase gradient image is acquired by an inverted microscope is illustrated in the above-described embodiments, for example, a phase gradient image may be acquired by an upright microscope. Although an example in which a phase gradient image is acquired based on transmitted light is illustrated in the above-described embodiments, the phase gradient image may be acquired based on reflected light. That is, the phase gradient image may be acquired using an epi-illumination optical system. Further, although an example in which an intensity modulation section includes a gradation filter has been illustrated in the above-described embodiments, the intensity modulation section may include a gradation mirror having an intensity reflectance distribution. In this case, an intensity reflectance distribution in a pupil or in an image of the pupil of the intensity modulation section may monotonously increase or monotonously decrease in a first direction.

Both the intensity transmittance distribution of the intensity modulation section and the intensity reflectance distribution of the intensity modulation section are distributions each representing a ratio of the intensity of light to be incident on the intensity modulation section and the intensity of light to be emitted from the intensity modulation section. That is, both the intensity transmittance distribution of the intensity modulation section and the intensity reflectance distribution of the intensity modulation section are examples of light utilization rate distributions each representing a light utilization rate in the intensity modulation section. Both a spectral intensity transmittance distribution of the intensity modulation section and a spectral intensity reflectance distribution of the intensity modulation section are examples of spectral light utilization rate distributions each representing a spectral light utilization rate in the intensity modulation section.

Figure 21A:
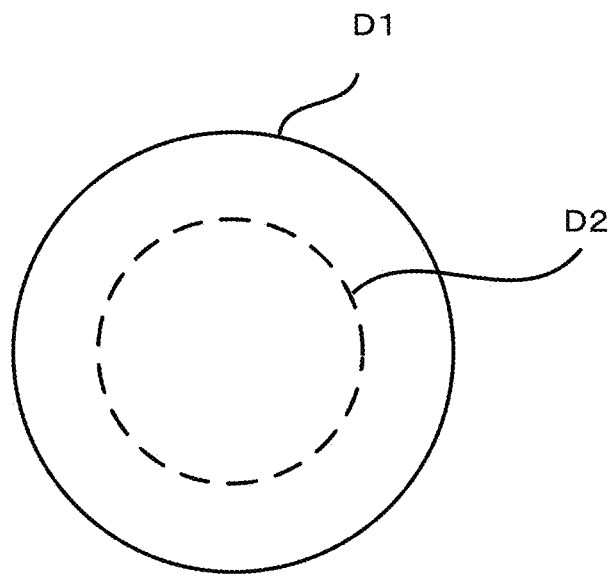
FIG. 21A shows the opening position of the aperture stop.
Figure 22A:
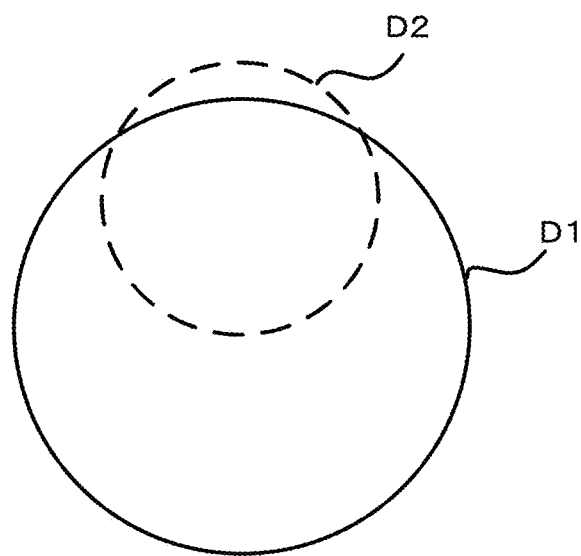
FIG. 22A shows the opening position of the aperture stop.
Figure 22B:
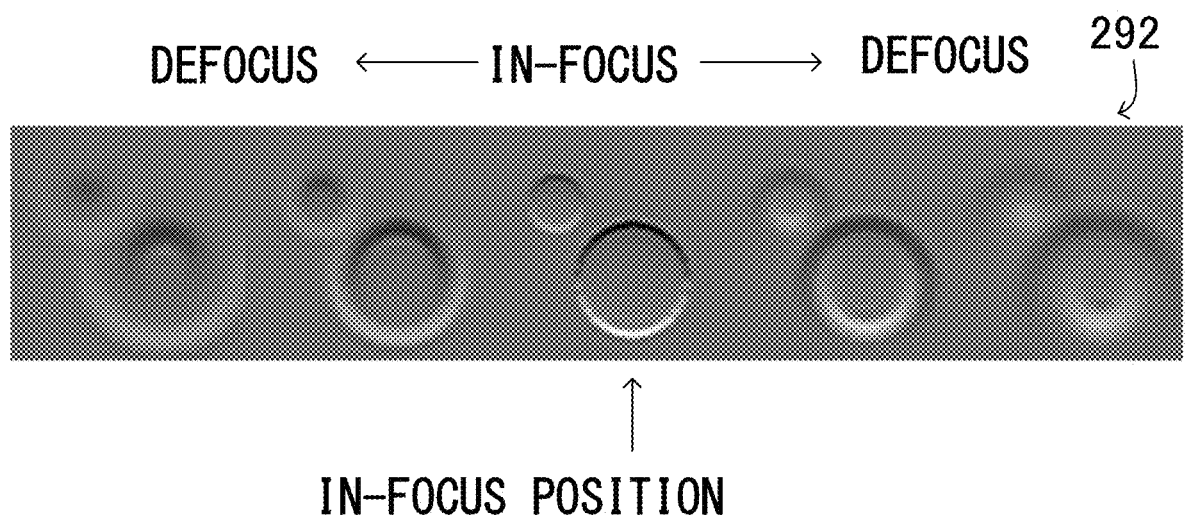
FIG. 22B shows the movement of an image with defocusing.

Although an example in which a center of an opening of an aperture stop is positioned on an optical axis is illustrated in the above-described embodiment, the aperture stop may have a structure in which an opening position is nonconcentric. Although the present invention is not particularly limited to a structure in which the opening position is nonconcentric, a cam or a slider, for example, may be adopted. FIG. 21 to FIG. 22 are diagrams each illustrating a relationship between an opening position of an aperture stop and movement of an image with defocusing. When an opening position (a region D2 through which an illumination light flux passes) is on an optical axis, as illustrated in FIG. 21A, an image may move in a direction perpendicular to the optical axis with defocusing, like an image 291 illustrated in FIG. 21B. When an opening position is nonconcentric with respect to an optical axis, i.e., a region D2 through which an illumination light flux passes is nonconcentric with respect to a pupil D1, as illustrated in FIG. 22A, movement of an image with defocusing can be suppressed, as illustrated in FIG. 22B.

The invention claimed is:

1. A microscope apparatus comprising:
   an illumination optical system that illuminates a sample;
   an observation optical system that guides light from the sample;
   an intensity modulator that is provided in a pupil of the observation optical system or a position optically conjugate with the pupil and reduces light incident on the intensity modulator at an intensity transmittance corresponding to a phase gradient of the sample; and
   an image acquisition section that acquires image data of the sample based on the light guided by the observation optical system from the sample, the image acquisition section including an image sensor,
   wherein a light utilization rate distribution as an intensity transmittance distribution of the intensity modulator in the pupil or in an image of the pupil monotonously increases or monotonously decreases in a first direction, and varies on both sides of a center of an optical axis,
   wherein the observation optical system and the intensity modulator are configured such that light beams, which constitute a light flux which is incident on the sample and is refracted by the phase gradient of the sample, pass through different positions of a pupil plane of the pupil or an optically conjugate pupil plane of the pupil where the intensity modulator is arranged, depending on the phase gradient occurring in regions through which the light beams have passed in the sample, whereby the light beams are respectively reduced at different intensity transmittances in the intensity modulator, and
   wherein the observation optical system guides the light beams reduced by the intensity modulator into the image sensor to form an optical image having a light intensity corresponding to the phase gradient of the sample on a light receiving surface of the image sensor to thereby generate a phase gradient image of the sample.

2. The microscope apparatus according to claim 1, further comprising
   a contrast enhancement section that performs image processing for enhancing a contrast of the phase gradient image of the sample which is to be displayed on a display device based on the image data acquired by the image acquisition section.

3. The microscope apparatus according to claim 2, further comprising the display device.

4. The microscope apparatus according to claim 2, further comprising
   a chroma enhancement section that performs processing for enhancing a chroma of the phase gradient image of the sample to be displayed on the display device based on the image data.

5. The microscope apparatus according to claim 1, wherein
   the observation optical system forms the optical image of the sample by the light flux to be emitted from the observation optical system and corresponding to a smaller numerical aperture than a numerical aperture on an image side of the observation optical system.

6. The microscope apparatus according to claim 5, wherein
   a numerical aperture of the illumination optical system is smaller than a numerical aperture on an object side of the observation optical system.

7. The microscope apparatus according to claim 6, wherein
   the numerical aperture of the illumination optical system is 90% or less of the numerical aperture on the object side of the observation optical system.

8. The microscope apparatus according to claim 6, further comprising
   an aperture stop arranged in an illumination optical system,
   wherein
   the intensity modulator is arranged on an optical path of the observation optical system, and
   the aperture stop is arranged at a position which is optically conjugate with the intensity modulator along the optical path and so that a center of an opening of the aperture is positioned on an optical axis which is a center of the pupil of the observation optical system, such that an image of the center of the opening of the aperture stop is projected onto the optical axis.

9. The microscope apparatus according to claim 5, further comprising an aperture stop.

10. The microscope apparatus according to claim 9, wherein
    the aperture stop has a structure in which an opening position is nonconcentric with respect to an optical axis.

11. The microscope apparatus according to claim 1, wherein a second-order differential value of the light utilization rate distribution in the pupil or in the image of the pupil with respect to a position in the first direction is positive.

12. The microscope apparatus according to claim 11, wherein
the light utilization rate distribution in the pupil or in the image of the pupil is an exponential function of the position in the first direction.

13. The microscope apparatus according to claim 1, wherein the light utilization rate distribution in the pupil or in the image of the pupil has an increase rate or a decrease rate that differs in a positive orientation of the first direction depending on a wavelength.

14. The microscope apparatus according to claim 13, wherein
the intensity modulator includes a plurality of intensity modulation elements respectively having different spectral light utilization rate distributions.

15. The microscope apparatus according to claim 1, wherein
a first light utilization rate distribution corresponding to a first wavelength of the intensity modulator in the pupil or in the image of the pupil monotonously increases in a positive orientation of the first direction,
a second light utilization rate distribution corresponding to a second wavelength of the intensity modulator in the pupil or in the image of the pupil monotonously increases in a negative orientation of the first direction, and
the first wavelength and the second wavelength differ from each other.

16. The microscope apparatus according to claim 1, wherein
a first light utilization rate distribution corresponding to a first wavelength of the intensity modulator in the pupil or in the image of the pupil monotonously increases or monotonously decreases in the first direction,
a second light utilization rate distribution corresponding to a second wavelength of the intensity modulator in the pupil or in the image of the pupil monotonously increases or monotonously decreases in a direction different from the first direction, and
the first wavelength and the second wavelength differ from each other.

17. The microscope apparatus according to claim 1, further comprising
a change device for changing the light utilization rate distribution in the pupil or in the image of the pupil.

18. The microscope apparatus according to claim 17, wherein
the change device rotates the intensity modulator.

19. The microscope apparatus according to claim 17, wherein
the intensity modulator includes a plurality of intensity modulation elements,
the plurality of intensity modulation elements respectively have light utilization rate distributions that differ from one another in orientation that monotonically increases or monotonically decreases, and
the change device moves the plurality of intensity modulation elements in a direction intersecting an optical axis of the observation optical system or an optical axis of the illumination optical system.

20. The microscope apparatus according to claim 17, wherein the change device changes an angle of the intensity modulator with respect to an optical axis of the observation optical system or an optical axis of the illumination optical system.

21. The microscope apparatus according to claim 17, wherein
the intensity modulator is arranged on a detection optical path, and
the change device is a variable focus optical system included in the observation optical system and arranged on an optical path between the intensity modulator and the sample.

22. The microscope apparatus according to claim 1, further comprising
a movement device for moving the intensity modulator in a direction along an optical axis of the observation optical system or a direction along an optical axis of the illumination optical system.

23. The microscope apparatus according to claim 1, wherein
the intensity modulator includes a spatial light modulator in which a plurality of pixels are arranged in a lattice shape.

24. The microscope apparatus according to claim 1, wherein
the intensity modulator includes a gradation filter having the intensity transmittance distribution.

25. A microscope apparatus comprising:
an illumination optical system that illuminates a sample;
an observation optical system that guides light from the sample; and
an intensity modulator that is provided in a pupil of the observation optical system or a position optically conjugate with the pupil and reduces light incident on the intensity modulator, at an intensity reflectance corresponding to a phase gradient of the sample; and
an image acquisition section that acquires image data of the sample based on the light guided by the observation optical system from the sample, the image acquisition section including an image sensor,
wherein a light utilization rate distribution as an intensity reflectance distribution of the intensity modulator in the pupil or in an image of the pupil monotonously increases or monotonously decreases in a first direction, and varies on both sides of a center of an optical axis,
wherein the observation optical system and the intensity modulator are configured such that light beams, which constitute a light flux which is incident on the sample and is refracted by the phase gradient of the sample, pass through different positions of a pupil plane of the pupil or an optically conjugate pupil plane of the pupil where the intensity modulator is arranged, depending on the phase gradient occurring in regions through which the light beams have passed in the sample, whereby the light beams are respectively reduced at different intensity reflectances in the intensity modulator, and
wherein the observation optical system guides the light beams reduced by the intensity modulator into the image sensor to form an optical image having a light intensity corresponding to the phase gradient of the sample on a light receiving surface of the image sensor to thereby generate a phase gradient image of the sample.

26. The microscope apparatus according to claim 25, further comprising a contrast enhancement section that performs image processing for enhancing a contrast of the phase gradient image of the sample which is to be displayed on a display device based on the image data acquired by the image acquisition section.

27. The microscope apparatus according to claim 26, further comprising
the display device.

28. The microscope apparatus according to claim 26, further comprising
a chroma enhancement section that performs processing for enhancing a chroma of the phase gradient image of the sample to be displayed on the display device based on the image data.

29. The microscope apparatus according to claim 25, wherein
the observation optical system forms the optical image of the sample by the light flux to be emitted from the observation optical system and corresponding to a smaller numerical aperture than a numerical aperture on an image side of the observation optical system.

30. The microscope apparatus according to claim 29, wherein
a numerical aperture of the illumination optical system is smaller than a numerical aperture on an object side of the observation optical system.

31. The microscope apparatus according to claim 30, wherein
the numerical aperture of the illumination optical system is 90% or less of the numerical aperture on the object side of the observation optical system.

32. The microscope apparatus according to claim 30, further comprising
an aperture stop arranged in an illumination optical system,
wherein
the intensity modulator is arranged on an optical path of the observation optical system, and
the aperture stop is arranged at a position which is optically conjugate with the intensity modulator along the optical path and so that a center of an opening of the aperture is positioned on an optical axis which is a center of the pupil of the observation optical system, such that an image of the center of the opening of the aperture stop is projected onto the optical axis.

33. The microscope apparatus according to claim 29, further comprising
an aperture stop.

34. The microscope apparatus according to claim 33, wherein
the aperture stop has a structure in which an opening position is nonconcentric with respect to an optical axis.

35. The microscope apparatus according to claim 25, wherein
a second-order differential value of the light utilization rate distribution in the pupil or in the image of the pupil with respect to a position in the first direction is positive.

36. The microscope apparatus according to claim 35, wherein
the light utilization rate distribution in the pupil or in the image of the pupil is an exponential function of the position in the first direction.

37. The microscope apparatus according to claim 25, wherein the light utilization rate distribution in the pupil or in the image of the pupil has an increase rate or a decrease rate that differs in a positive orientation of the first direction depending on a wavelength.

38. The microscope apparatus according to claim 37, wherein
the intensity modulator includes a plurality of intensity modulation elements respectively having different spectral light utilization rate distributions.

39. The microscope apparatus according to claim 25, wherein
a first light utilization rate distribution corresponding to a first wavelength of the intensity modulator in the pupil or in the image of the pupil monotonously increases in a positive orientation of the first direction,
a second light utilization rate distribution corresponding to a second wavelength of the intensity modulator in the pupil or in the image of the pupil monotonously increases in a negative orientation of the first direction, and
the first wavelength and the second wavelength differ from each other.

40. The microscope apparatus according to claim 25, wherein
a first light utilization rate distribution corresponding to a first wavelength of the intensity modulator in the pupil or in the image of the pupil monotonously increases or monotonously decreases in the first direction,
a second light utilization rate distribution corresponding to a second wavelength of the intensity modulator in the pupil or in the image of the pupil monotonously increases or monotonously decreases in a direction different from the first direction, and
the first wavelength and the second wavelength differ from each other.

41. The microscope apparatus according to claim 25, further comprising
a change device for changing the light utilization rate distribution in the pupil or in the image of the pupil.

42. The microscope apparatus according to claim 41, wherein
the change device rotates the intensity modulator.

43. The microscope apparatus according to claim 41, wherein
the intensity modulator includes a plurality of intensity modulation elements, the plurality of intensity modulation elements respectively have light utilization rate distributions that differ from one another in orientation that monotonically increases or monotonically decreases, and
the change device moves the plurality of intensity modulation elements in a direction intersecting an optical axis of the observation optical system or an optical axis of the illumination optical system.

44. The microscope apparatus according to claim 41, wherein
the change device changes an angle of the intensity modulator with respect to an optical axis of the observation optical system or an optical axis of the illumination optical system.

45. The microscope apparatus according to claim 41, wherein
the intensity modulator is arranged on a detection optical path, and
the change device is a variable focus optical system included in the observation optical system and arranged on an optical path between the intensity modulator and the sample.

46. The microscope apparatus according to claim 25, further comprising
 a movement device for moving the intensity modulator in a direction along an optical axis of the observation optical system or a direction along an optical axis of the illumination optical system.

47. The microscope apparatus according to claim 25, wherein
 the intensity modulator includes a spatial light modulator in which a plurality of pixels are arranged in a lattice shape.

48. The microscope apparatus according to claim 25, wherein
 the intensity modulator includes a gradation mirror having the intensity reflectance distribution.

* * * * *